United States Patent
Shiba

(10) Patent No.: US 8,185,054 B2
(45) Date of Patent: May 22, 2012

(54) INFORMATION PROCESSING APPARATUS, INFORMATION PROCESSING METHOD, AND RECORDING MEDIUM

(75) Inventor: Kenji Shiba, Tokyo (JP)

(73) Assignee: Sony Corporation, Tokyo (JP)

( * ) Notice: Subject to any disclaimer, the term of this patent is extended or adjusted under 35 U.S.C. 154(b) by 618 days.

(21) Appl. No.: 12/364,692

(22) Filed: Feb. 3, 2009

(65) Prior Publication Data

US 2009/0197539 A1   Aug. 6, 2009

(30) Foreign Application Priority Data

Feb. 5, 2008   (JP) ................. 2008-025457

(51) Int. Cl.
*H04B 15/00* (2006.01)
*H04B 17/00* (2006.01)
(52) U.S. Cl. ........................................... 455/62
(58) Field of Classification Search .............. 455/62
See application file for complete search history.

(56) References Cited

U.S. PATENT DOCUMENTS
6,253,082 B1   6/2001   Hengeveld
2005/0119006 A1*  6/2005   Cave et al. ............... 455/453

FOREIGN PATENT DOCUMENTS

| EP | 1 672 839 A2 | 6/2006 |
|---|---|---|
| EP | 1 811 721 A1 | 7/2007 |
| JP | 03-192942 A | 8/1991 |
| JP | 2002-026984 A | 1/2002 |
| JP | 2002-158667 A | 5/2002 |
| JP | 2003-110572 A | 4/2003 |
| JP | 2005-244330 A | 9/2005 |
| JP | 2006-094394 A | 4/2006 |
| JP | 2007-116672 A | 5/2007 |
| WO | WO 2007/013839 A1 | 2/2007 |

* cited by examiner

*Primary Examiner* — Lincoln Donovan
*Assistant Examiner* — Daniel Rojas
(74) *Attorney, Agent, or Firm* — Wolf, Greenfield & Sacks, P.C.

(57) ABSTRACT

There is provided an information processing apparatus according to the present invention performing a bidirectional communication with another information processing apparatus through a plurality of channels in a predetermined frequency band, and including a selecting portion for selecting an identifier from a plurality of identifiers to use for connection with the another information processing apparatus; a radio wave state monitoring portion for monitoring a radio wave state of the plurality of channels; and a channel controlling portion for setting the channel having satisfactory radio wave state as the channel to use in the bidirectional communication based on a monitoring result of the radio wave state.

18 Claims, 15 Drawing Sheets

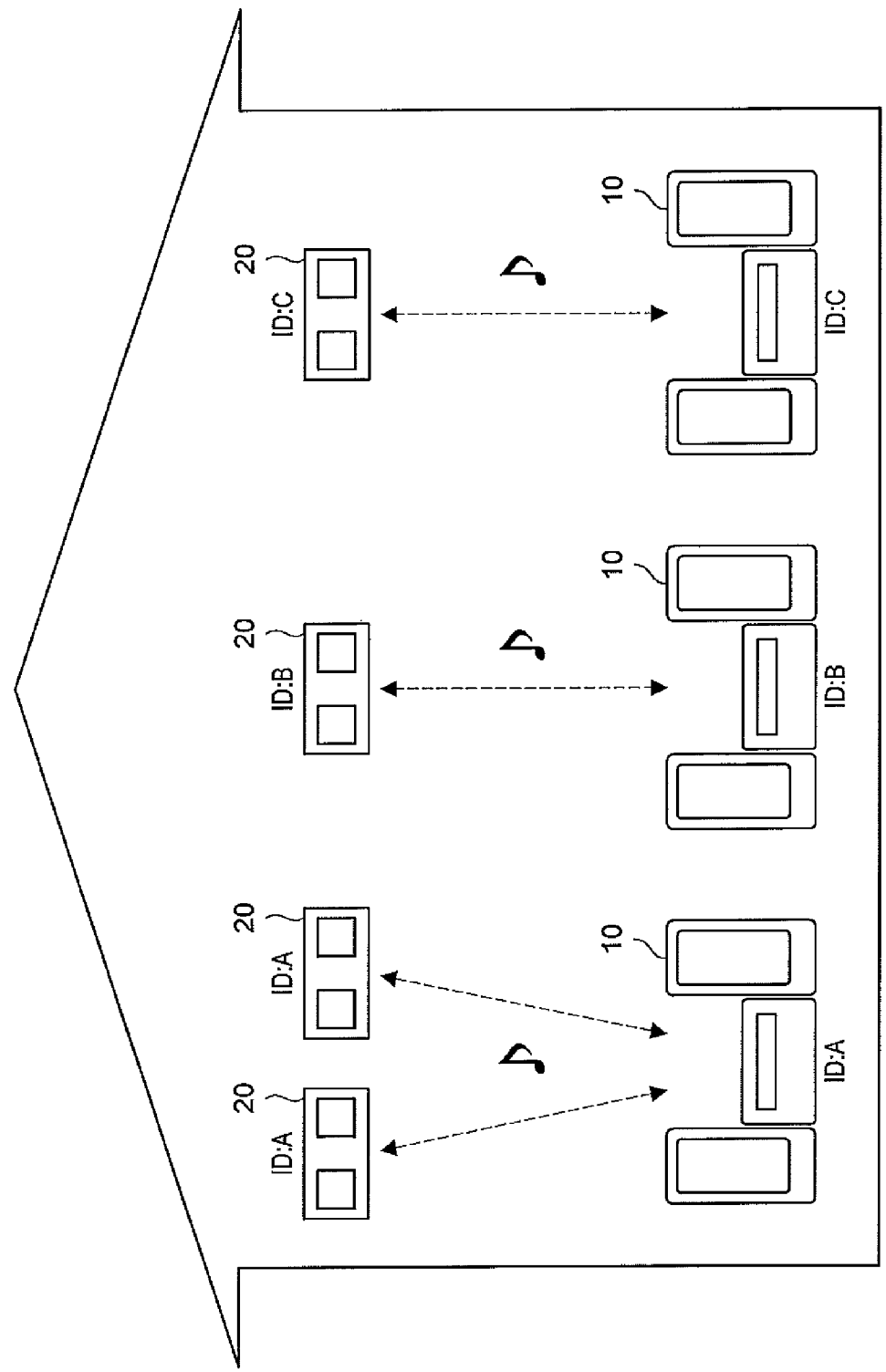

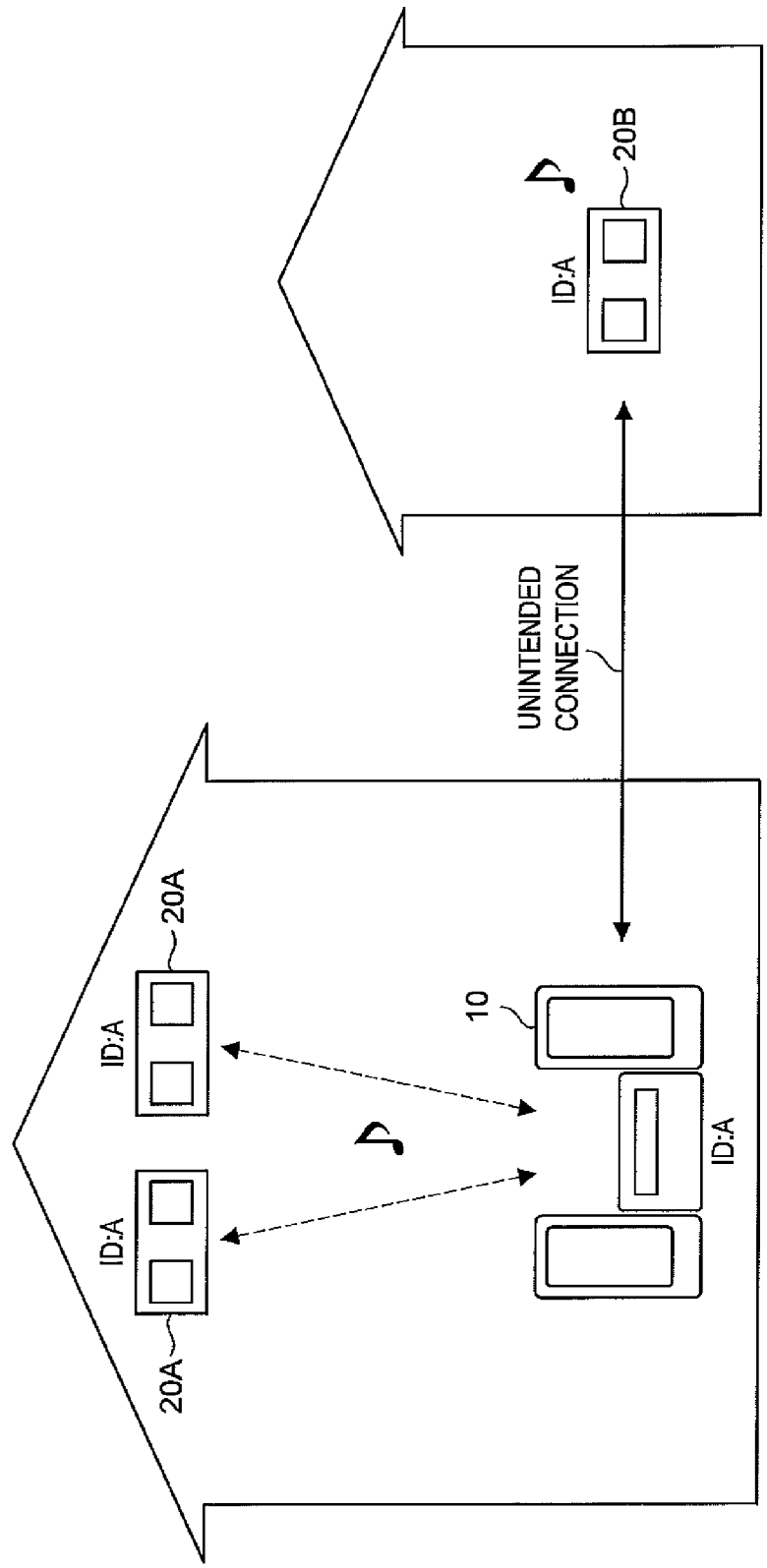

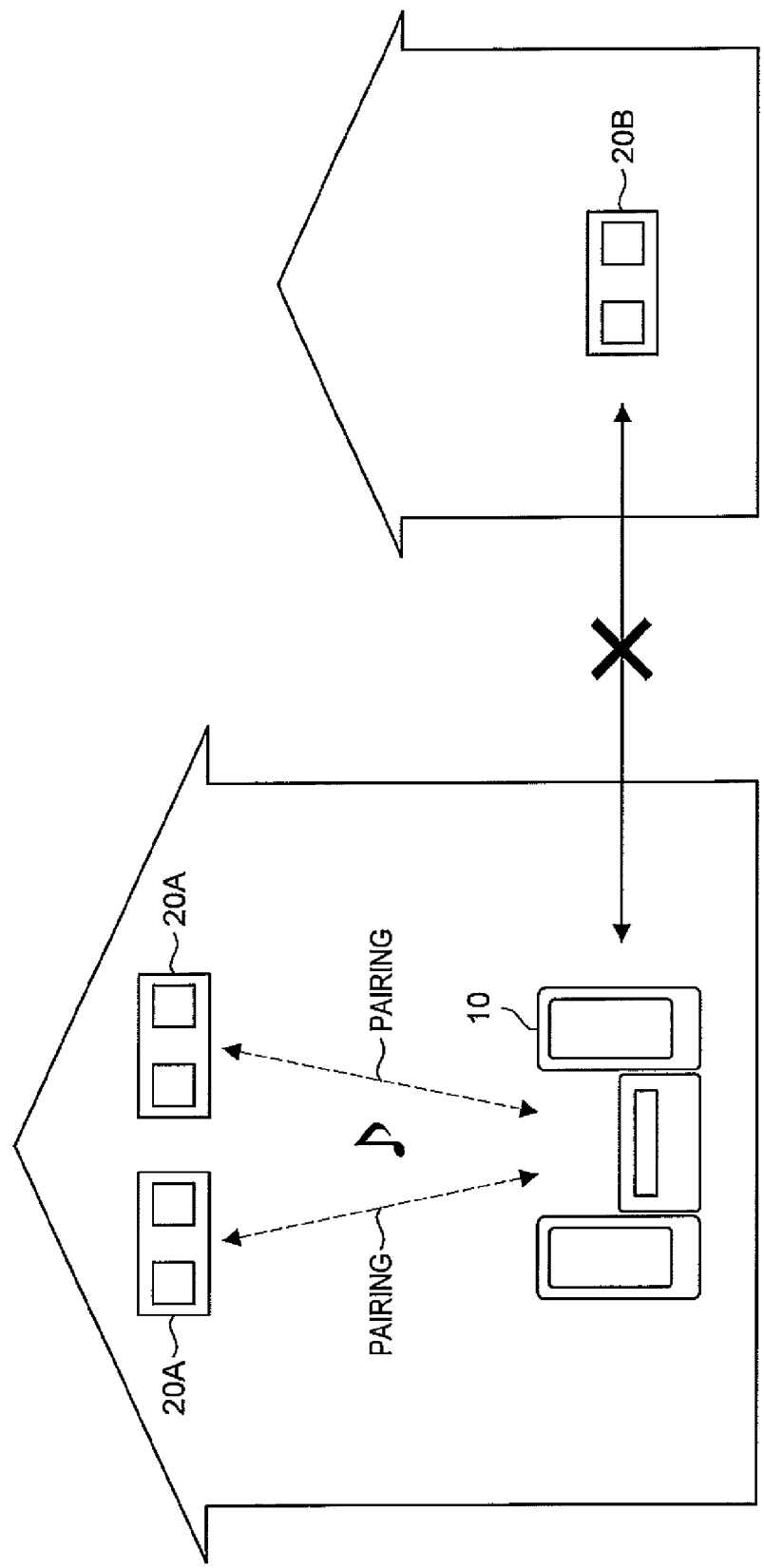

INFORMATION PROCESSING APPARATUS, INFORMATION PROCESSING METHOD, AND RECORDING MEDIUM

CROSS-REFERENCE TO RELATED APPLICATION

The present invention contains subject matter related to Japanese Patent Application JP 2008-025457 filed in the Japan Patent Office on Feb. 5, 2008, the entire contents of which being incorporated herein by reference.

BACKGROUND OF THE INVENTION

1. Field of the Invention

The present invention relates to an information processing apparatus, an information processing method, and a recording medium.

2. Description of the Related Art

In recent years, networks using wireless LAN (Local Area Network) are being built in offices and homes, and systems for AV (Audio Visual) related data transmission of moving image, still image, audio, and the like using the wireless LAN are becoming widespread. In such systems, the throughput may lower due to various types of interferences arising from the use of radio.

A plurality of radio channels is normally usable in such systems, and if a plurality of systems coexists in the respective communication range, the respective system desirably avoids interference by setting to a channel at which interference does not occur.

However, it is difficult in reality for a general user to recognize the respective radio channel and carry out the setting, or to understand the cause of interference and set an appropriate radio channel. In particular, the interference has a characteristic of suddenly appearing and disappearing rather than existing on a steady basis, and thus is difficult to foresee.

Thus, in a system using the wireless LAN of the related art, a method is proposed in a channel switching device separately connected to a plurality of wireless LAN devices that carry out the wireless communication to collect a line status among wireless LAN devices, issue a request to change the channel based on the line status, and giving higher priority when performing communication for switching the radio channel than when performing communication for data transmission to thereby rapidly switch the radio channel according to the communication situation and make disturbances and interruptions of images and sounds as short as possible (see e.g., Japanese Patent Application Laid-Open No. 2006-94394).

SUMMARY OF THE INVENTION

However, in the method of Japanese Patent Application Laid-Open No. 2006-94394, the plurality of devices may simultaneously switch to the same radio channel having a satisfactory line status, in which case a so-called collision state in which the chain of channel switching occurs and none of the device is able to communicate as a result may occur.

The present invention addresses the above-identified and other problems associated with methods and devices in the past, and desirably provides a new and improved information processing apparatus capable of preventing the so-called collision state in which the radio channel is changed in chain reaction in a plurality of information processing apparatuses, an information processing method, and a program thereof.

According to an embodiment of the present invention, there is provided an information processing apparatus for performing a bidirectional communication of information with another information processing apparatus through a plurality of channels in a predetermined frequency band, the information processing apparatus including: a selecting portion for selecting an identifier from a plurality of identifiers to use for connection with the another information processing apparatus; a radio wave state monitoring portion for monitoring a radio wave state of the plurality of channels; and a channel controlling portion for setting the channel having satisfactory radio wave state of the plurality of channels as the channel to use in the bidirectional communication based on a monitoring result of the radio wave state monitoring portion.

The channel controlling portion changes a channel to use in the bidirectional communication to another channel having a more satisfactory radio wave state when another channel having a more satisfactory radio wave state than the set channel exists. Furthermore, the channel controlling portion sets the channel associated with the identifier selected by the selecting portion as the channel to use in the bidirectional communication when the channel is changed for a predetermined number of times within a predetermined period.

The channel controlling portion may cancel the bidirectional communication using the channel corresponded to the identifier when the connection with the another information processing apparatus is canceled.

The channel controlling portion may cancel the bidirectional communication using the channel corresponded to the identifier when the bidirectional communication using the channel corresponded to the identifier is performed for a predetermined time.

The radio wave state monitoring portion may monitor the radio wave state of the plurality of channels based on at least presence of interference of the radio waves.

The information processing apparatus further includes a pairing controlling portion for performing a control of a pairing process for specifying the another information processing apparatus to perform the bidirectional communication. The pairing controlling portion may notify a pairing identifier associating the another information processing apparatus for performing the bidirectional communication and the information processing apparatus to another information processing apparatus for performing the bidirectional communication.

According to another embodiment of the present invention, there is provided an information processing method for performing a bidirectional communication of information with another information processing apparatus through a plurality of channels in a predetermined frequency band, the information processing method including the steps of: selecting an identifier from a plurality of identifiers to use for connection with the another information processing apparatus; monitoring a radio wave state of the plurality of channels; and setting the channel having satisfactory radio wave state of the plurality of channels as the channel to use in the bidirectional communication based on a monitoring result of the radio wave state. The information processing method further includes a changing step of changing the channel to use in the bidirectional communication to another channel having a more satisfactory radio wave state when another channel having a more satisfactory radio wave state than the set channel exists. In this information processing method, the channel to use in the bidirectional communication is changed to the channel associated with the selected identifier to perform the bidirectional communication with the another information processing apparatus when the channel is changed for a predetermined number of times within a predetermined period.

According to another embodiment of the present invention, there is provided a recording medium recorded with a program for causing a computer to function as an information processing apparatus for performing a bidirectional communication of information with another information processing apparatus through a plurality of channels in a predetermined frequency band, the recording medium being recorded with a program for the computer to realize selecting function of selecting an identifier from a plurality of identifiers to use for connection with the another information processing apparatus; monitoring function of monitoring a radio wave state of the plurality of channels; and channel setting function of setting the channel having satisfactory radio wave state of the plurality of channels as the channel to use in the bidirectional communication based on a monitoring result of the radio wave state. The recording medium is also recorded with a program for causing the computer to realize a changing function of changing the channel to use in the bidirectional communication to another channel having a more satisfactory radio wave state when another channel having a more satisfactory radio wave state than the set channel exists. The recording medium is also recorded with a program for causing computer to realize a channel controlling function of setting the channel associated with the selected identifier as the channel to use in the bidirectional communication when the channel is changed for a predetermined number of times within a predetermined period.

According to such configuration, the computer program is stored in the storage portion of the computer, and read and executed by a CPU arranged in the computer to cause the computer to function as the information processing apparatus described above. A computer readable recording medium recorded with the computer program may be provided. The recording medium may be a magnetic disc, an optical disc, a magnetic optical disc, a flash memory, or the like. The computer program may be distributed through the network without using the recording medium.

According to the embodiments of the present invention described above, the information processing apparatus performs a bidirectional communication with another information processing apparatus using a channel corresponded to the identifier selected by the selecting portion when the channel is changed for a predetermined number of times within a predetermined period, and thus the channel change is prevented from occurring in chain reaction when a collision state in which the radio channel is changed in chain reaction occurs in a plurality of information processing apparatuses.

BRIEF DESCRIPTION OF THE DRAWINGS

FIG. 6B is an explanatory view for describing the function of an identifier in the audio signal transmission system according to the embodiment;

FIG. 14A is an explanatory view for describing a pairing function in the audio signal transmission system according to the embodiment;

FIG. 14B is an explanatory view for describing the pairing function in the audio signal transmission system according to the embodiment;

DETAILED DESCRIPTION OF THE PREFERRED EMBODIMENTS

Figure 1:
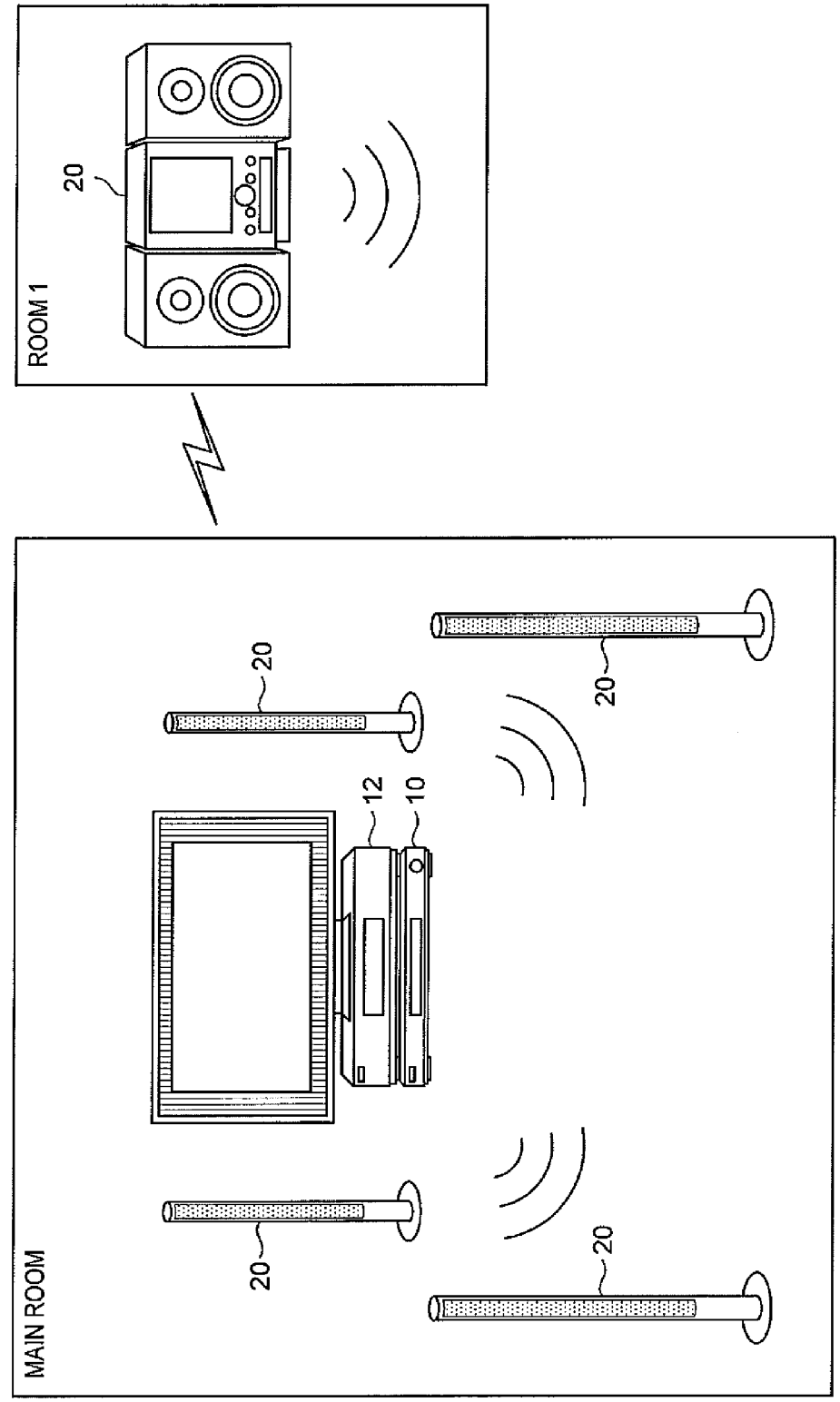
FIG. 1 is an explanatory view for describing an audio signal transmission system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 16:
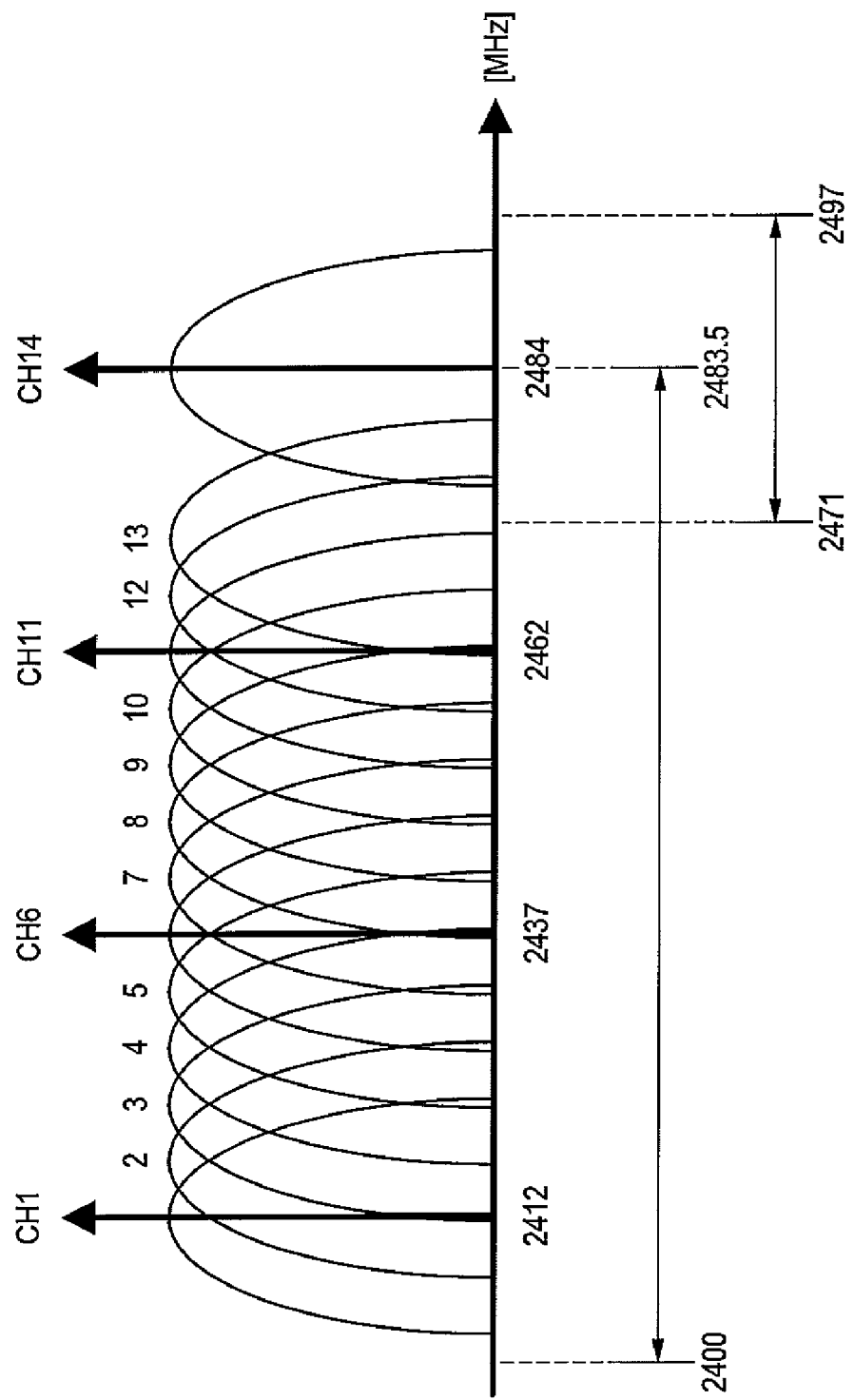
FIG. 16 is an explanatory view showing a physical radio channel of IEEE 802.11b.

The inventors of the present application made reviews to solve the above issues, and came up with the following problems. FIG. 16 is an explanatory view showing a physical radio channel of IEEE 802.11b, which is one of the standards of wireless LAN (Local Area Network). As shown in FIG. 16, the wireless LAN of this standard has the center frequency of thirteen channels (CH) set at an interval of 5 MH in the frequency band of 2400 MHz to 2483.5 MHz, and the frequency band of 2471 MHz to 2497 MHz is set for one channel (center frequency 2484 MHz). CH1 to CH13 have a bandwidth of 20 MHz with the center frequency as the center. The above channels mean the communication path used to exchange wireless data.

When realizing a bidirectional data communication using such radio channels, a master unit (access point) selects one channel to use from the radio channels shown in FIG. 16, and performs a setting. When installing a plurality of master units in the same area, setting is desirably made in view of the channel distant with respect to each master unit so that mutual interference in radio wave does not occur. For example, in the example shown in FIG. 16, CH1 of center frequency 2412 MHz, CH6 of center frequency 2437 MHz, and CH11 of center frequency 2462 MHz are set with respect to three master units to prevent mutual interference in radio wave.

When a slave unit such as a personal computer (PC) is connected to the master unit, arbitrary alpha-numerals of a maximum of 32 letters (Service Set Identifier: SSID) are set the same for the master unit and the slave unit, but such setting may not be easily performed in audio devices without GUI (Graphical User Interface), and the like. In wireless LAN, an encryption key such as WEP (Wired Equivalent Privacy) key are set to prevent eavesdropping by a third person, but such setting is also difficult in audio devices without the GUI and a keyboard.

Furthermore, when a plurality of apparatuses simultaneously switches to the same radio channel having satisfactory radio wave state due to poor radio wave state by interference of radio wave and the like, a so-called collision state in which none of the apparatuses are able to communicate as a result may occur.

The inventors of the present application carried out intensive research to solve the above problems, and contrived an information processing apparatus and an information processing method described below.

First Embodiment

<Regarding Audio Signal Transmission System According to the Present Embodiment>

First, an audio signal transmission system according to the present embodiment will now be described in detail with reference to FIG. 1.

As shown in FIG. 1, the audio signal transmission system 1 according to the present embodiment includes an audio signal transmitting apparatus 10 which is an example of an information processing apparatus according to the present embodiment, and an audio signal receiving apparatus 20.

The audio signal transmitting apparatus 10 which is an example of the information processing apparatus according to the present embodiment wirelessly transmits an audio signal to the audio signal receiving apparatus 20 and receives various information transmitted from the audio signal receiving apparatus 20. The audio signal transmitting apparatus 10 may acquire the audio signal to wirelessly transmit from an audio signal output apparatus 12 such as DVD player, and Blu-ray disk (hereinafter abbreviated as BD) player, or the audio signal transmitting apparatus 10 itself may have the function of the audio signal output apparatus. The audio signal transmitting apparatus 10 and the audio signal receiving apparatus 20 perform transmission of audio signals and bidirectional data communication of various information using the band of the radio wave. Thus, the audio signal transmitting apparatus 10 and the audio signal receiving apparatus 20 may be arranged in the same room, or may be arranged in different rooms, as shown in FIG. 1.

The audio signal receiving apparatus 20 receives the audio signal transmitted by the audio signal transmitting apparatus 10, and transmits information related to the connection of the audio signal receiving apparatus 20, and various information such as change request notification of the transmitted audio signal to the audio signal transmitting apparatus 10. The audio signal receiving apparatus 20 may be a surround speaker group wirelessly connected to the audio signal transmitting apparatus 10, as shown in the MAIN ROOM of FIG. 1, or may be an audio signal output apparatus such as audio component stereo for outputting the audio signal transmitted from the audio signal transmitting apparatus 10, as shown in ROOM 1 of FIG. 1. The audio signal receiving apparatus 20 may also be an audio signal acquiring apparatus such as headphone and earphone.

<Regarding Hardware Configuration of Audio Signal Transmitting Apparatus 10>

Figure 2:
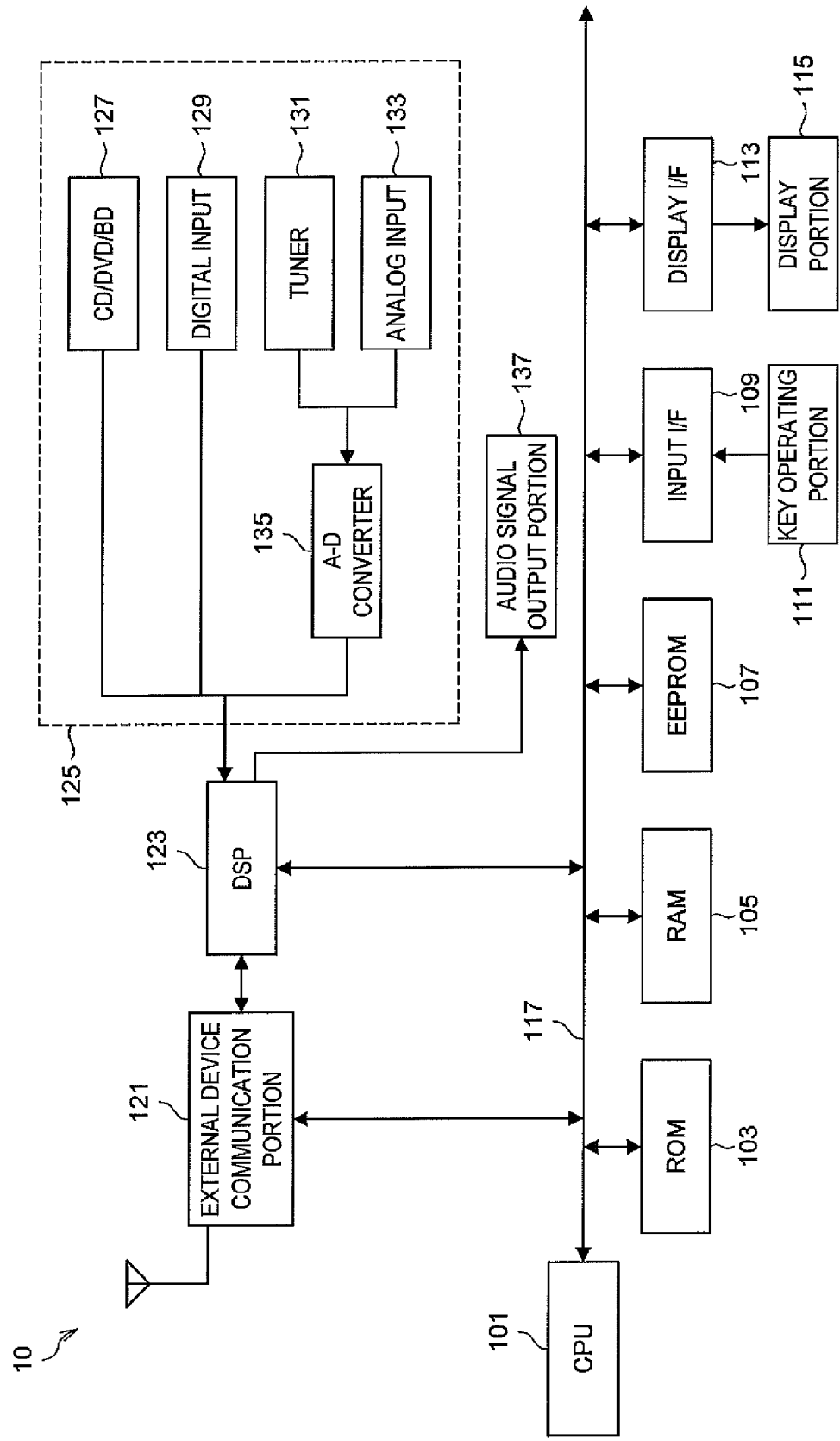
FIG. 2 is a block diagram for describing a hardware configuration of an audio signal transmitting apparatus according to the embodiment.

The hardware configuration of the audio signal transmitting apparatus 10 according to the present embodiment will now be described in detail with reference to FIG. 2. FIG. 2 is a block diagram for describing the hardware configuration of the audio signal transmitting apparatus 10 according to the present embodiment.

As shown in FIG. 2, the audio signal transmitting apparatus 10 according to the present embodiment includes a CPU 101, a ROM 103, a RAM 105, an EEPROM (Electronically Erasable and Programmable Read Only Memory) 107, an input interface (I/F) 109, a display interface (I/F) 113, and an external device communication portion 121.

A DSP 123 is connected to the external device communication portion 121.

The CPU 101 functions as a calculation processing apparatus and a control apparatus, and controls all or some of the operations in the audio signal transmitting apparatus 10 according to various programs recorded in the ROM 103, the RAM 105, the EEPROM 107, and the like. The ROM 103 and the EEPROM 107 store programs, calculation parameters, and the like to be used by the CPU 101. The RAM 105 primary stores the programs to be used in the execution of the CPU 101, the parameters that appropriately change in the execution, and the like. These are mutually connected by a host bus of an internal bus such as CPU bus and a system bus 117 of an external bus such as PCI (Peripheral Component Interconnect/Interface) bus.

The input interface 109 is an interface configured to include an input control circuit and the like for generating an input signal based on the information input by the user using a key operating portion 111, and outputting the signal to the CPU 101. The user of the audio signal transmitting apparatus 10 can input various data or instruct processing operations to the audio signal transmitting apparatus 10 by operating the key operating portion 111 as described later.

The key operating portion 111 is an operating portion for inputting various data and instructing processing operations to the audio signal transmitting apparatus 10. The key operating portion 111 is an operation unit operated by the user, such as mouse, keyboard, touch panel, button, switch, and lever. The key operating portion 111 may be a remote control unit (i.e., remote controller) using infrared light and other radio waves, or may be an externally connected device such as portable telephone and PDA corresponding to the operation of the audio signal transmitting apparatus 10.

The display interface 113 is an interface for transmitting an output signal output from the CPU 101 to the display portion 115, to be described later. The display portion 115 is configured to include a device capable of visually notifying various information to the user, such as CRT display device, liquid crystal display device, plasma display device, EL display device, and display device of lamp etc.

The external device communication portion 121 is a communication interface configured to include a communication device etc. for communicating with the audio signal receiving apparatus 20, and various types of audio signal output apparatuses. The external device communication portion 121 may be an interface complying with a general wireless audio transmission standard, or may be an interface complying with a specific wireless audio transmission standard. The audio signal transmitting apparatus 10 according to the present embodiment transmits the audio signal to the audio signal receiving apparatus 20 via the external device communication portion 121, and performs bidirectional data communication with the audio signal receiving apparatus 20.

The DSP 123 is a specialized CPU for various processing with respect to the audio signal and the image signal. The DSP 123 is connected with an audio signal input portion 125 input with the audio signal used in transmission, and an audio signal output portion 137 from which the acquired audio signal is output.

The audio signal input portion 125 is a processing portion input with the audio signal used for transmission by the audio signal transmitting apparatus 10 according to the present embodiment. The audio signal input portion 125 is configured to include a CD/DVD/BD 127, a digital input 129 connected with digital devices such as MD (Mini Disk), a tuner 131, an analog input 133 connected with an analog device such as cassette tape and recorder, and the like. The audio signal input from the tuner 131 and the analog input 133 is converted from an analog signal to a digital signal by the A-D converter 135. The audio signal input by the audio signal input portion 125 is transmitted to the audio signal receiving apparatus 20 via the DSP 123 and the external device communication portion 121.

The audio signal output portion 137 is a processing portion for outputting the audio signal input from the audio signal input portion 125 to the outside of the audio signal transmitting apparatus 10. The audio signal output portion 137 is configured to include a D-A converter (not shown) for converting the audio signal, which is a digital signal, to an analog signal, an amplification portion (not shown) for amplifying the audio signal converted to the analog signal, a speaker (not shown) for outputting the amplified audio signal, and the like.

In addition to the above configuration, the audio signal transmitting apparatus 10 according to the present embodiment may include a storage device (not shown), a drive (not shown), and the like.

The storage device is a device for storing data configured as an example of a storage portion of the audio signal transmitting apparatus 10 according to the present embodiment, and is configured to include a magnetic storage device such as HDD (Hard Disk Drive), a semiconductor storage device, an optical storage device, a magnetic optical storage device, or the like. The storage device can store programs and various data to be executed by the CPU 101, externally acquired audio signal, and the like.

The drive is a storage medium reader/writer, and is incorporated in or externally attached to the audio signal transmitting apparatus 10. The drive reads out information recorded in a loaded removable recording medium such as magnetic disc, optical disc, magnetic optical disc, or semiconductor memory, and outputs the information to the RAM 105. The drive can also write records to the loaded removable recording medium such as magnetic disc, optical disc, magnetic optical disc, or semiconductor memory. The removable recording medium is DVD media, HD-DVD media, Blu-ray media, compact flash (CF, registered trademark), memory stick, SD memory card (Secure Digital memory card), and the like. The removable recording medium may be an IC card (Integrated Circuit card) mounted with a non-contact IC chip, or may be an electronic device.

According to the configuration described above, the audio signal transmitting apparatus 10 acquires the audio signal from a variety of audio signal output sources, and transmits the audio signal to the audio signal receiving apparatus 20 via the external device communication portion 121, and can also perform bidirectional data communication with the audio signal receiving apparatus 20.

One example of the hardware configuration capable of realizing the functions of the audio signal transmitting apparatus 10 according to the present embodiment has been described above. Each component may be configured using a general member, or may be configured to include a hardware specialized for the function of each component. Therefore, the hardware configuration to use can be appropriately changed according to the technical level of the time of implementing the present embodiment.

<Regarding Hardware Configuration of Audio Signal Receiving Apparatus 20>

Figure 3:
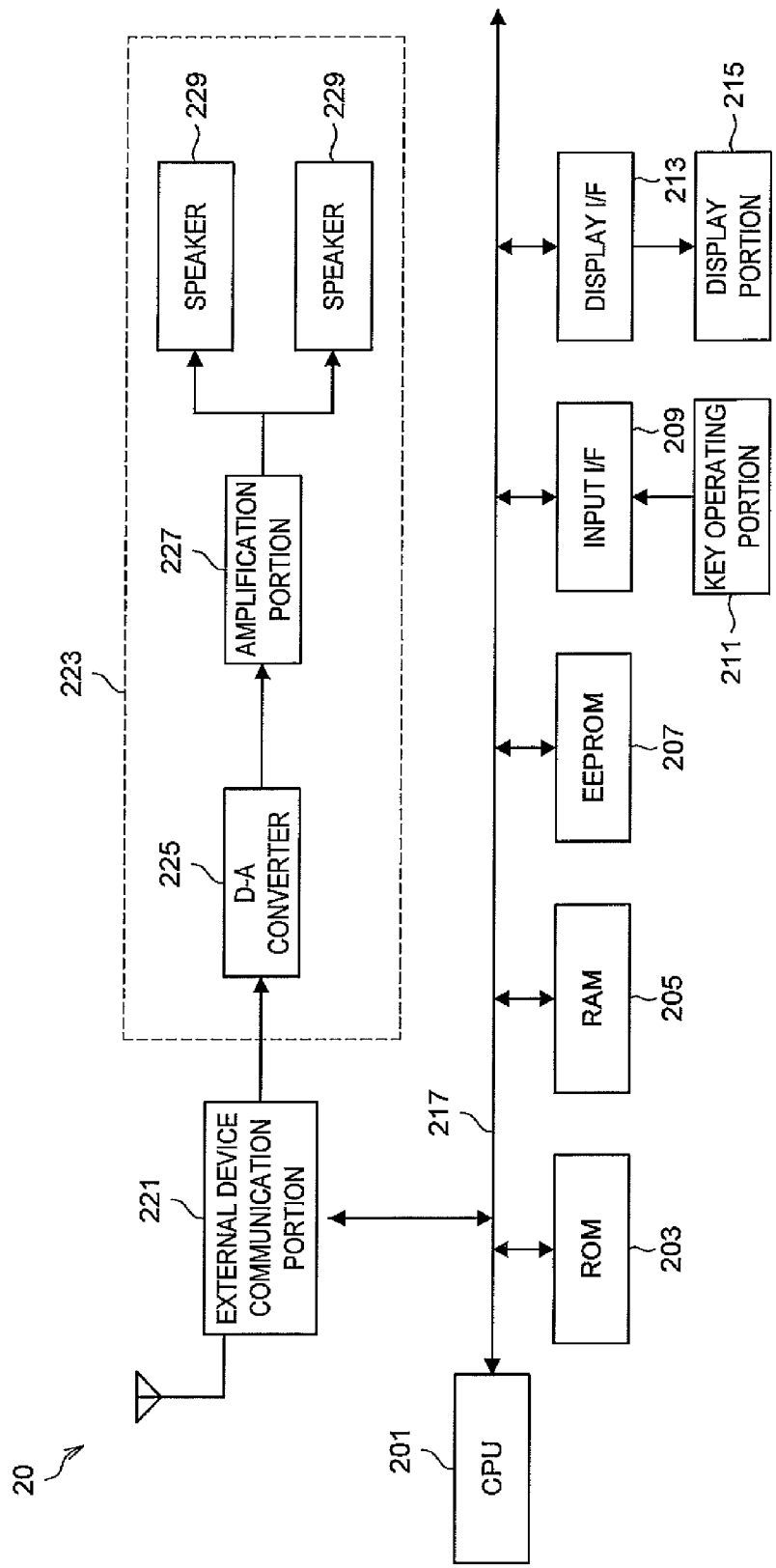
FIG. 3 is a block diagram for describing the hardware configuration of an audio signal receiving apparatus according to the embodiment.

The hardware configuration of the audio signal receiving apparatus 20 according to the present embodiment will now be described in detail with reference to FIG. 3. FIG. 3 is a block diagram for describing the hardware configuration of the audio signal receiving apparatus 20 according to the present embodiment.

As shown in FIG. 3, the audio signal receiving apparatus 20 according to the present embodiment includes a CPU 201, a ROM 203, a RAM 205, an EEPROM 207, an input interface (I/F) 209, a display interface (I/F) 213, and an external device communication portion 221.

The external device communication portion 221 is connected with an audio signal output portion 223 for outputting the received audio signal.

The CPU 101 functions as a calculation processing apparatus and a control apparatus, and controls all or some of the operations in the audio signal receiving apparatus 20 according to various programs recorded in the ROM 203, the RAM 205, the EEPROM 207, and the like. The ROM 203 and the EEPROM 207 store programs, calculation parameters, and the like to be used by the CPU 201. The RAM 205 primary stores the programs to be used in the execution of the CPU 201, the parameters that appropriately change in the execution, and the like. These are mutually connected by a host bus of an internal bus such as CPU bus and a system bus 217 of an external bus such as PCI bus.

The input interface 209 is an interface configured to include an input control circuit and the like for generating an input signal based on the information input by the user using a key operating portion 211, and outputting the signal to the CPU 201. The user of the audio signal receiving apparatus 20 can input various data or instruct processing operations to the audio signal receiving apparatus 20 by operating the key operating portion 211 as described later.

The key operating portion 211 is an operating portion for inputting various data and instructing processing operations to the audio signal receiving apparatus 20. The key operating portion 211 is an operation unit operated by the user, such as mouse, keyboard, touch panel, button, switch, and lever. The key operating portion 211 may be a remote control unit (i.e., remote controller) using infrared light and other radio waves, or may be an externally connected device such as portable telephone and PDA corresponding to the operation of the audio signal receiving apparatus 20.

The display interface 213 is an interface for transmitting an output signal output from the CPU 201 to the display portion 215, to be described later. The display portion 215 is configured to include a device capable of visually notifying various information to the user, such as CRT display device, liquid crystal display device, plasma display device, EL display device, and display device of lamp etc.

The external device communication portion 221 is a communication interface configured to include a communication device etc. for communicating with the audio signal transmitting apparatus 10, and various types of audio signal output apparatuses. The external device communication portion 221 may be an interface complying with a general wireless audio transmission standard, or may be an interface complying with a specific wireless audio transmission standard. The audio signal receiving apparatus 20 according to the present embodiment receives the audio signal from the audio signal transmitting apparatus 10 via the external device communication portion 221, and performs bidirectional data communication with the audio signal transmitting apparatus 10.

The audio signal output portion 223 is a processing portion for outputting the audio signal transmitted from the audio signal transmitting apparatus 10. As shown in FIG. 3, the audio signal output portion 223 is configured to include a D-A converter 225, an amplification portion 227, and a speaker 229.

The D-A converter 225 converts the received audio signal from the digital signal to the analog signal. The audio signal converted to the analog signal is amplified by the amplification portion 227, and output from the speaker 229.

The audio signal receiving apparatus 20 according to the present embodiment may include a DSP and an audio signal input portion arranged in the audio signal transmitting apparatus 10 according to the present embodiment. Furthermore, the audio signal receiving apparatus 20 may, in addition to the above configuration, include a storage device (not shown), a drive (not shown) and the like.

The storage device is a device for storing data configured as an example of a storage portion of the audio signal receiving apparatus 20 according to the present embodiment, and is configured to include a magnetic storage device such as HDD (Hard Disk Drive), a semiconductor storage device, an optical storage device, a magnetic optical storage device, or the like. The storage device can store programs and various data to be executed by the CPU 201, externally acquired audio signal, and the like.

The drive is a storage medium reader/writer, and is incorporated in or externally attached to the audio signal receiving apparatus 20. The drive reads out information recorded in a loaded removable recording medium such as magnetic disc, optical disc, magnetic optical disc, or semiconductor memory, and outputs the information to the RAM 205. The drive can also write records to the loaded removable recording medium such as magnetic disc, optical disc, magnetic optical disc, or semiconductor memory. The removable recording medium is DVD media, HD-DVD media, Blu-ray media, compact flash (registered trademark), memory stick, SD memory card, and the like. The removable recording medium may be an IC card mounted with a non-contact IC chip, or may be an electronic device.

According to the configuration described above, the audio signal receiving apparatus 20 can acquire the audio signal from the audio signal transmitting apparatus 10 via the external device communication portion 221, and can also perform bidirectional data communication with the audio signal transmitting apparatus 10.

One example of the hardware configuration capable of realizing the functions of the audio signal receiving apparatus 20 according to the present embodiment has been described above. Each component may be configured using a general member, or may be configured to include a hardware specialized for the function of each component. Therefore, the hardware configuration to use can be appropriately changed according to the technical level of the time of implementing the present embodiment.

<Regarding Configuration of Audio Signal Transmitting Apparatus 10>

Figure 4:
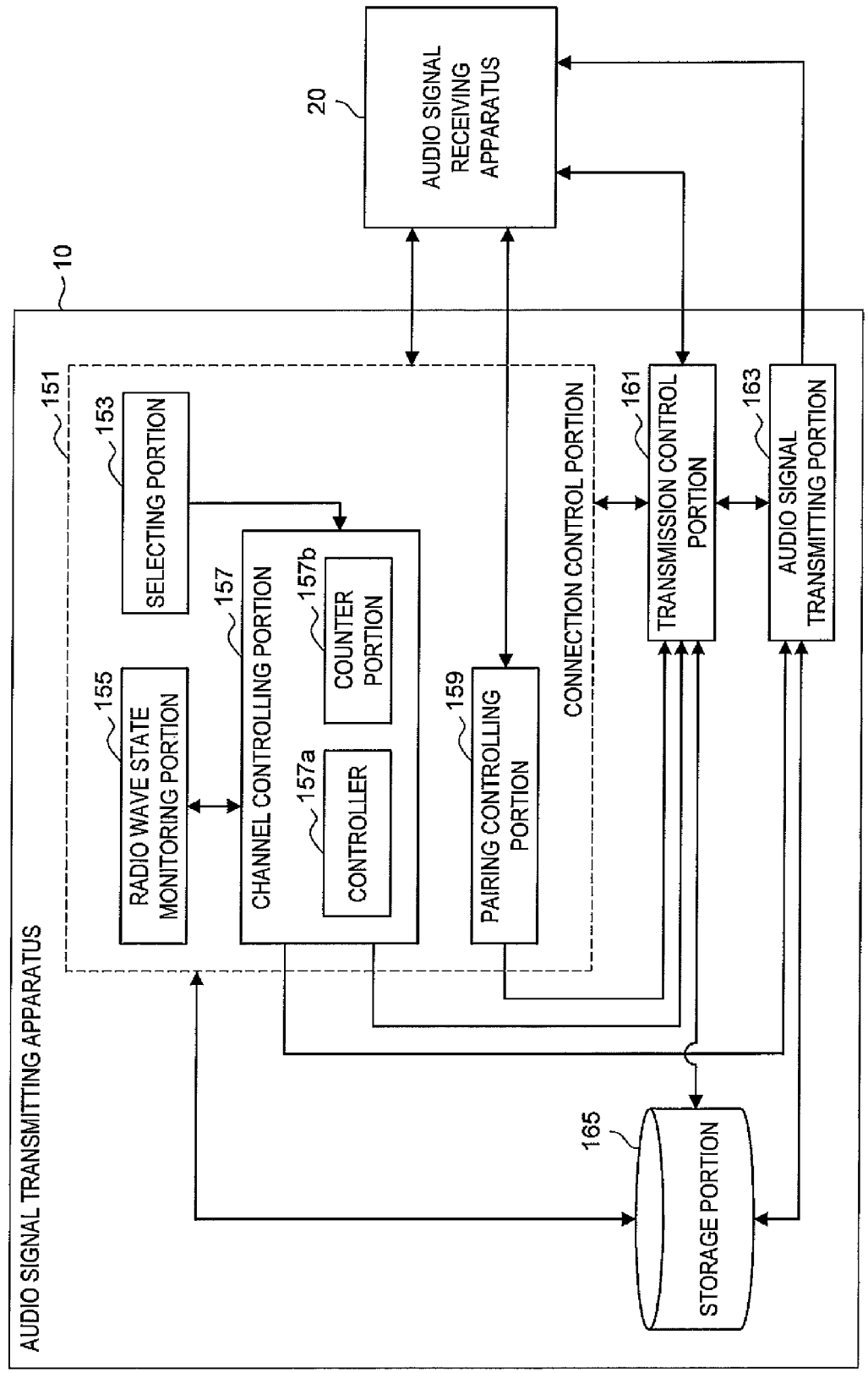
FIG. 4 is a block diagram for describing a configuration of the audio signal transmitting apparatus according to the embodiment.

The configuration of the audio signal transmitting apparatus 10 according to the present embodiment will now be described in detail with reference to FIG. 4. FIG. 4 is a block diagram for describing the configuration of the audio signal transmitting apparatus 10 according to the present embodiment.

The audio signal transmitting apparatus 10 which is an example of the information processing apparatus according to the present embodiment mainly includes a connection control portion 151, a transmission control portion 161, an audio signal transmitting portion 163, and a storage portion 165, as shown in FIG. 4.

The connection control portion 151 is configured to include the CPU, the ROM, the RAM, the EEPROM, the external device communication portion, and the like, and performs connection control of the externally connected device such as the audio signal receiving apparatus 20 connected to the audio signal transmitting apparatus 10. The connection control portion 151 determines the decision on the connection when receiving a connection establishment request transmitted from the externally connected device such as the audio signal receiving apparatus 20, and establishes the connection with the externally connected device when determining that the connection may be established. When receiving a connection cancel request transmitted from the externally connected device such as the audio signal receiving apparatus 20, the connection control portion 151 cancels the connection with the audio signal receiving apparatus 20. The connection control portion 151 grasps the number of externally connected devices that can be connected to the audio signal transmitting apparatus 10 and the operational status thereof based on operational status information related to the operational status of the receiving apparatus, and performs connection management.

Specifically, the connection control portion 151 controls the connection of the externally connected device according to the presence and the operation status of the externally connected device (e.g., externally connected device such as the audio signal receiving apparatus 20 according to the present embodiment, and headphone connected to the audio signal transmitting apparatus 10 and/or audio signal receiving apparatus 20) that can be connected to the audio signal transmitting apparatus 10.

As shown in FIG. 4, the connection control portion 151 further includes a selecting portion 153, a radio wave state monitoring portion 155, a channel controlling portion 157, and a pairing controlling portion 159.

When the user operates an identifier selection slide switch, an identifier selection button, or the like arranged in the audio signal transmitting apparatus 10 to select the identifier used for the connection with the audio signal receiving apparatus 20, which is another information processing apparatus, from a plurality of identifiers, the selecting portion 153 converts the input by the identifier selection slide switch or the identifier selection button to a predetermined signal, and sets the identifier specified by the identifier selection slide switch or the identifier selection button as a selected identifier.

The plurality of identifiers used for the connection with the audio signal receiving apparatus 20, which is another information processing apparatus, are individually associated with a radio channel used in the bidirectional data communication with the audio signal receiving apparatus 20. The information related to the radio channel corresponded to the identifier is recorded in the storage portion 165, to be described later, as a database in a format shown in table 1 below.

TABLE 1

| Identifier | Center frequency of channel [MHz] |
|---|---|
| A | 2412 |
| B | 2437 |
| C | 2462 |

Here, in table 1, three types of identifiers, A, B, and C used in the connection with the audio signal receiving apparatus 20, which is another information processing apparatuses, exist, each of which are corresponded with the radio channel of center frequency 2412 MHz, center frequency 2437 MHz, and center frequency 2462 MHz.

The identifier selected by the operating portion 151 and the information related to the radio channel corresponded to the selected identifier are transmitted to the channel controlling portion 157 and the pairing controlling portion 159, to be described later. The operating portion 151 may record the information related to the selected identifier to a storage portion 165 to be described later.

The radio wave state monitoring portion 155 constantly monitors the radio wave states of all radio channels used in the bidirectional data communication with the audio signal receiving apparatus 20, which is another information processing apparatus. The radio wave state monitoring portion 155 determines good and bad of the radio wave state based at least on whether or not a radio wave that is interfering exists with respect to each radio channel. The radio wave state monitoring portion 155 may monitor the radio wave state based on not only the presence of the interfering radio wave (interference wave), but also on the radio wave intensity, the throughput, the CN radio (Carrier to Noise ratio), or the like of each radio channel.

The radio wave state monitoring portion 155 outputs the radio wave state of each radio channel to the channel controlling portion 157 to be described later. The radio wave state monitoring portion 155 may output the radio wave state of each radio channel to the channel controlling portion 157 in real time, or may output at a predetermined time interval. The radio wave state monitoring portion 155 may record the determination result of the radio wave state of each radio channel in the storage portion 165 as history information in association with date, time, and the like.

The channel controlling portion 157 sets the radio channel with satisfactory radio wave state from the plurality of radio channels as the radio channel to use in the bidirectional data communication with the audio signal receiving apparatus 20 based on the radio wave state of the radio channel transmitted from the radio wave state monitoring portion 155. For instance, the channel controlling portion 157 sets the radio channel with most satisfactory radio wave state as the radio channel to use in the bidirectional data communication based on the monitoring result transmitted from the radio wave state monitoring portion 155.

The channel controlling portion 157 references the monitoring result transmitted from the radio wave state monitoring portion 155, and dynamically changes the radio channel to use in the bidirectional data communication to a radio channel with more satisfactory radio wave state if a radio channel with more satisfactory radio wave state than the radio channel currently used in the bidirectional data communication with the audio signal receiving apparatus 20 exists.

The channel controlling portion 157 is arranged with a controller 157a and a counter portion 157b, where the operations of the controller 157a and the counter portion 157b can be considered as operation of the channel controlling portion 157. The counter portion 157b counts how many times channel change from the radio channel with unsatisfactory radio wave state to the radio channel with satisfactory radio wave state is performed in a predetermined period (e.g., one second). The counter portion 157b outputs the count result to the controller 157a for every elapse of a predetermined period. When the count result transmitted from the counter portion 157b exceeds a predetermined threshold value (e.g., three times/second), the controller 157 sets the radio channel corresponded to the identifier selected by the selecting portion 153 as the radio channel to use in the bidirectional data communication with the audio signal receiving apparatus 20 irrespective of the monitoring result of the radio wave state transmitted from the radio wave state monitoring portion 155.

The channel controlling portion 157 outputs the information related to the channel set for the radio channel to use in the bidirectional data communication to the transmission control portion 161 and the audio signal transmitting portion 163, to be described later. The transmission control portion 161 and the audio signal transmitting portion 163 performs transmission and reception of various information and control signal, transmission of audio signal, and the like based on the radio channel information transmitted from the channel controlling portion 157.

If the connection with the audio signal receiving apparatus 20 is canceled when the radio channel corresponded to the identifier selected by the selecting portion 153 is set for the radio channel to use in the bidirectional data communication, the channel controlling portion 157 cancels the bidirectional data communication using the radio channel corresponded to the identifier, and may set the radio channel with satisfactory radio wave state as the radio channel to use in the bidirectional data communication based on the monitoring result transmitted from the radio wave state monitoring portion 155.

If the radio channel corresponded to the identifier selected by the selecting portion 153 is set for the radio channel to use in the bidirectional data communication, and the bidirectional data communication using the relevant radio channel is performed for a predetermined time, the channel controlling portion 157 cancels the bidirectional data communication using the radio channel corresponded to the identifier, and may set the radio channel with satisfactory radio wave state as the radio channel to use for the bidirectional data communication based on the monitoring result transmitted from the radio wave state monitoring portion 155.

The pairing controlling portion 159 performs control of the pairing process allowing only a specific audio signal receiving apparatus 20 to be connectable with the audio signal transmitting apparatus 10 to prevent connection (link) with the unintended audio signal receiving apparatus 20. The connection (link) of the audio signal transmitting apparatus 10 and the audio signal receiving apparatus 20 refers to a state in which the audio signal transmitting apparatus 10, which is a master unit, and the audio signal receiving apparatus 20, which is a slave unit, are communicable, and in which transmission and reproduction of the audio signal are actually possible following a predetermined procedure.

When the user operates the pairing button and the like arranged on the audio signal transmitting apparatus 10 and requests execution of the pairing process, the operation made by the user is converted to a predetermined signal meaning the start of the pairing process, and transmitted to the pairing controlling portion 159. The pairing controlling portion 159 starts the pairing process when receiving the signal meaning the start of the pairing process. The pairing process will be described in detail below.

The transmission control portion 161 is configured to include the CPU, the ROM, the RAM, the EEPROM, the external device communication portion, and the like, and controls the transmission of the audio signal between the audio signal transmitting apparatus 10 and the audio signal receiving apparatus 20. In transmission of the audio signal, the transmission control portion 161 generates transmission control information to use in transmission control of the audio signal so as to reflect change in connection status of the audio signal receiving apparatus 20, which is an externally connected device, and various requests from the audio signal receiving apparatus 20 while referencing various types of databases stored in the storage portion 165, to be described later, various information transmitted from the connection control portion 151, and the like. The generated transmission control information is output to the audio signal transmitting portion 163, to be described later, and transmitted towards the audio signal receiving apparatus 20. The newly generated transmission control information may be recorded in the storage portion 165.

The audio signal transmitting portion 163 is configured to include the CPU, the ROM, the RAM, the EEPROM, the DSU, the external device communication portion, and the like, and distributes the audio signal to each channel based on the transmission control information transmitted from the transmission control portion 161 and transmits the same to the audio signal receiving apparatus 20 using the radio channel of the frequency specified from the connection control portion 151 (more specifically, channel controlling portion 157).

The audio signal transmitted by the audio signal transmitting portion 163 may be acquired from the audio signal output apparatus 12 connected to the audio signal transmitting apparatus 10, or may be an audio signal recorded in the storage portion 165, to be described later.

The storage portion 165 is a storage device arranged in the audio signal transmitting apparatus 10 according to the present embodiment, and is stored with database recorded with types etc. of audio signal configuring the transmission control information, various transmission information that may be transmitted to the audio signal receiving apparatus 20, various programs and processing methods used by the audio signal transmitting apparatus 10 according to the present embodiment, and the like. The storage portion 165 may also be recorded with audio signal itself.

The storage portion 165 is further recorded with information related to the radio channel used in the bidirectional data communication with the audio signal receiving apparatus 20, information related to the radio channel corresponded to the identifier as shown in table 1, and the like.

The storage portion 165 can, other than the database and the program, also appropriately store various parameters, mid-progress of the process, etc. saved for the audio signal transmitting apparatus 10 to perform some kind of process. The storage portion 165 may be freely read from and written to by each processing portion such as the connection control portion 151, the transmission control portion 161, and the audio signal transmitting portion 163, configuring the audio signal transmitting apparatus 10.

Other than the above-described processing portions, the audio signal transmitting apparatus 10 may be arranged with a each processing portion such as a display portion for presenting various information to the user, and a display control portion for controlling the display portion.

One example of the functions of the audio signal transmitting apparatus 10 according to the present embodiment has been described above. Each component above may be configured using a general member or circuit, or may be configured to include a hardware specialized for the function of each component. The function of each component may all be carried out by the CPU and the like. Therefore, the configuration to use can be appropriately changed according to the technical level of the time of implementing the present embodiment.

<Regarding Configuration of Audio Signal Receiving Apparatus 20>

Figure 5:
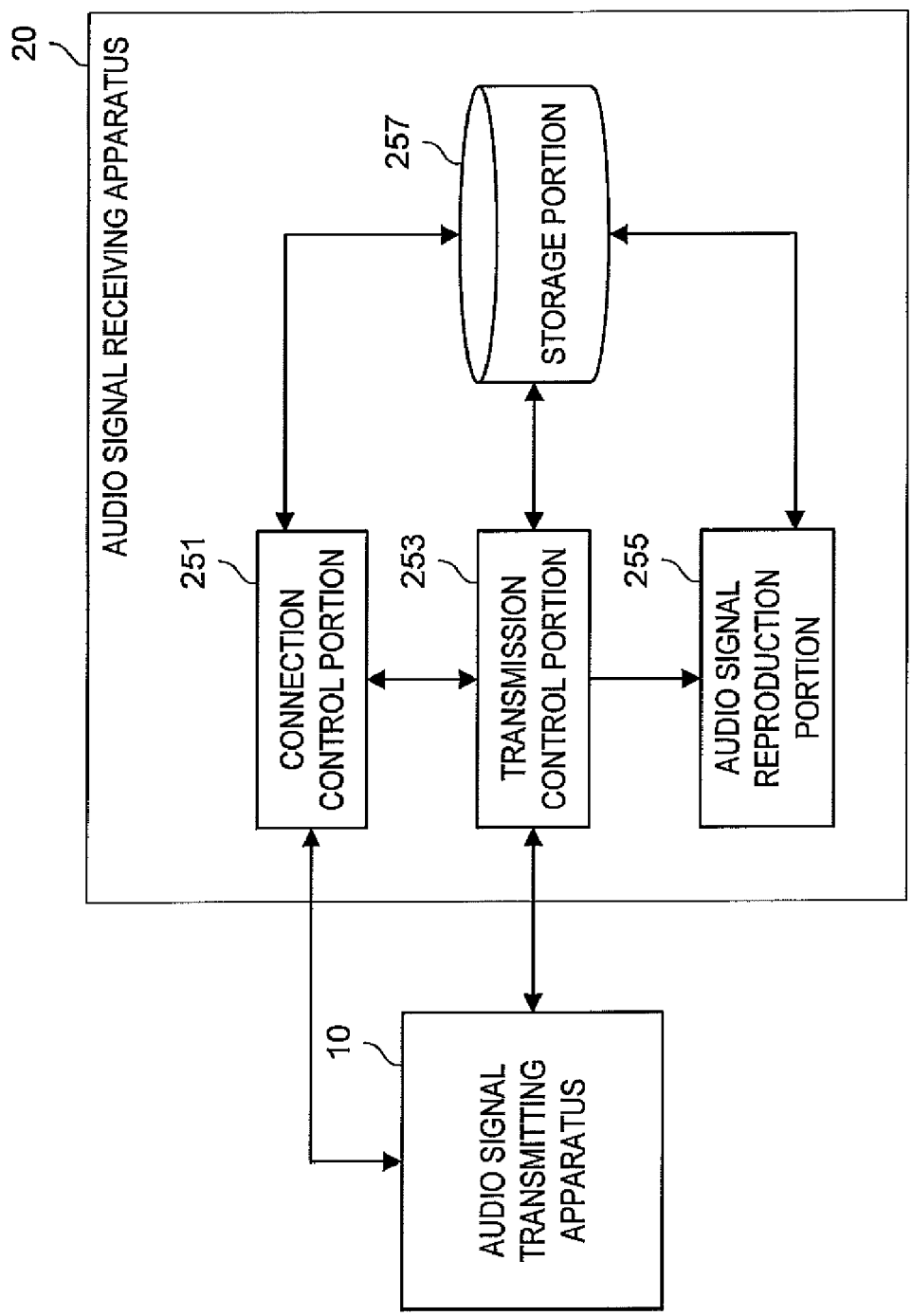
FIG. 5 is a block diagram for describing a configuration of the audio signal receiving apparatus according to the embodiment.

The configuration of the audio signal receiving apparatus 20 according to the present embodiment will now be described in detail with reference to FIG. 5. FIG. 5 is a block diagram for describing the configuration of the audio signal receiving apparatus 20 according to the present embodiment.

The audio signal receiving apparatus 20 according to the present embodiment mainly includes a connection control portion 251, a transmission control portion 253, an audio signal reproduction portion 255, and a storage portion 257, as shown in FIG. 5.

The connection control portion 251 is configured to include the CPU, the ROM, the RAM, the EEPROM, the external device communication portion, and the like, and performs connection control of the audio signal receiving apparatus 20 and the audio signal transmitting apparatus 10. More specifically, the connection control portion 251 transmits connection information for changing the connection state of the audio signal receiving apparatus 20 and the audio signal transmitting apparatus 10 to the audio signal transmitting apparatus 10. The connection information for changing the connection state includes a connection establishment request of the audio signal receiving apparatus 20 to the audio signal transmitting apparatus 10, a connection cancel request of the audio signal receiving apparatus 20 to the audio signal transmitting apparatus 10, information notifying ON/OFF state of the power supply of the audio signal receiving apparatus 20, and the like.

The connection control portion 151 may also transmit an identifier specifying the audio signal receiving apparatus 20 and the like when transmitting the connection information to the audio signal transmitting apparatus 10.

The transmission control portion 253 is configured to include the CPU, the ROM, the RAM, the EEPROM, the external device communication portion, and the like, and performs control when receiving the audio signal transmitted from the audio signal transmitting apparatus 10. When controlling the audio signal transmitting apparatus 10 from the audio signal receiving apparatus 20, the transmission control portion 161 performs transmission control of each type of transmission command transmitted to the audio signal transmitting apparatus 10.

More specifically, the transmission control portion 253 receives the audio signal from the audio signal transmitting apparatus 10, which is the master unit, based on the transmission control information transmitted from the master unit and outputs the received audio signal to the audio signal reproduction portion 255, to be described later.

The audio signal reproduction portion 255 is configured to include the CPU, the ROM, the RAM, the EEPROM, the DSU, the external device communication portion, and the like, and reproduces the audio signal transmitted from the audio signal transmitting apparatus 10 acquired by the CPU transmission control portion 253. In reproducing the audio signal, the audio signal reproduction portion 255 can perform adjustment of volume and travel control of the audio signal. In reproducing the audio signal, the audio signal reproduction portion 255 may also reference various types of databases recorded in the storage portion 257, to be described later.

The storage portion 257 is a storage device arranged in the audio signal receiving apparatus 20 according to the present embodiment, and is stored with database recorded with types etc. of audio signal configuring the transmission control information, various transmission information that may be transmitted to the audio signal transmitting apparatus 10, various programs and processing methods used by the audio signal receiving apparatus 20 according to the present embodiment, and the like.

The storage portion 257 can, other than the database and the program, also appropriately store various parameters, mid-progress of the process, etc. saved for the audio signal receiving apparatus 20 to perform some kind of process. The storage portion 257 may be freely read from and written to by each processing portion such as the connection control portion 251, the transmission control portion 253, and the audio signal reproduction portion 255, configuring the audio signal receiving apparatus 20.

One example of the functions of the audio signal receiving apparatus 20 according to the present embodiment has been described above. Each component above may be configured using a general member or circuit, or may be configured to include a hardware specialized for the function of each component. The function of each component may all be carried out by the CPU and the like. Therefore, the configuration to use can be appropriately changed according to the technical level of the time of implementing the present embodiment.

<Regarding Channel Changing Method of Audio Signal Transmitting Apparatus 10 According to the Present Embodiment>

The channel changing method of the audio signal transmitting apparatus 10 according to the present embodiment will now be described in detail with reference to FIGS. 6A to 13.

Figure 6A:
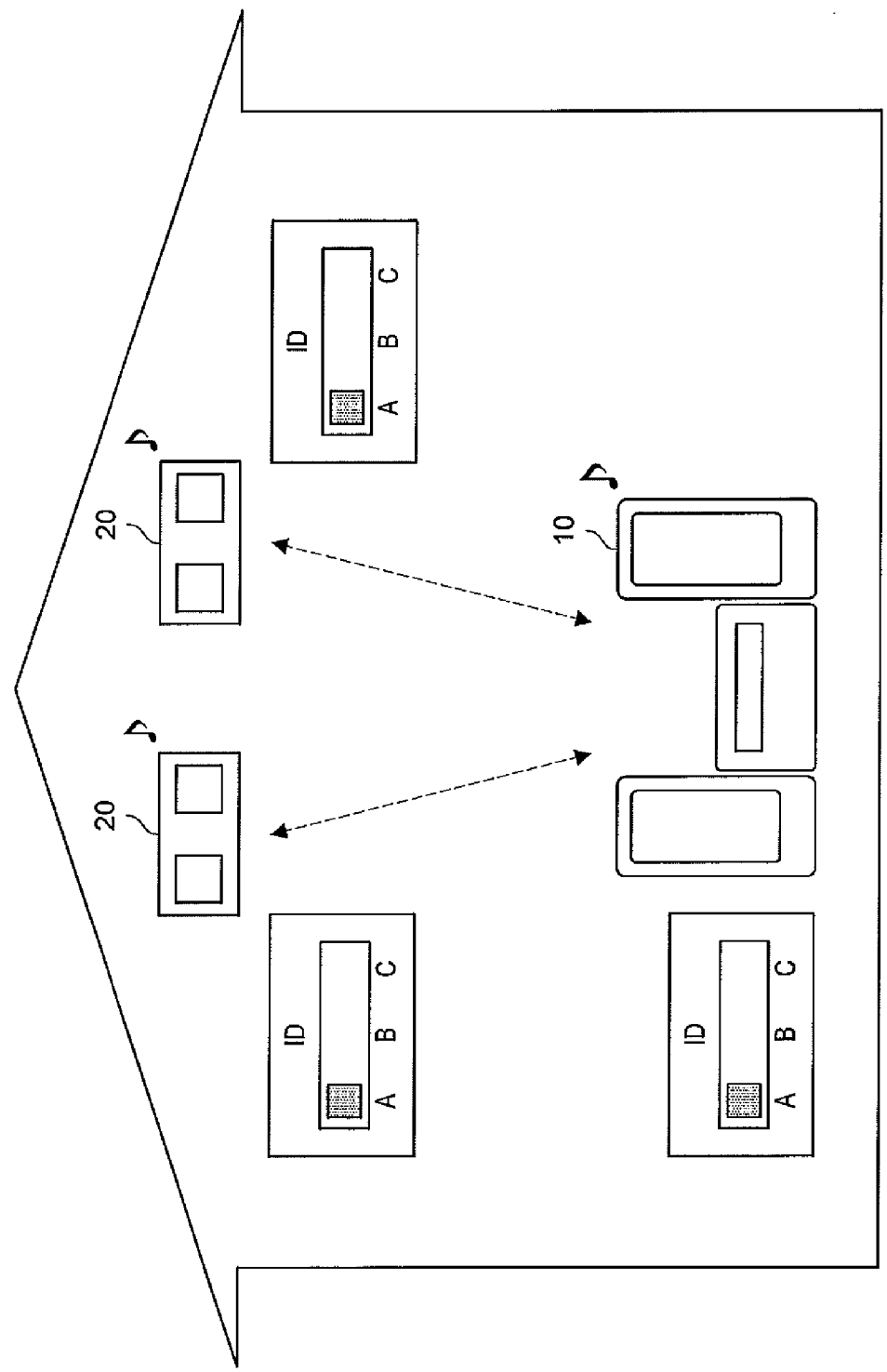
FIG. 6A is an explanatory view for describing the function of an identifier in the audio signal transmission system according to the embodiment.

FIGS. 6A and 6B are explanatory views for describing the function of the identifier in an audio signal transmission system according to the present embodiment. In the audio signal transmission system 1 according to the present embodiment, the identifier (ID) of the same number as the number of radio channel that can be used without causing mutual interference in radio wave in the same area is given to the audio signal transmitting apparatus 10, which is the master unit, and the audio signal receiving apparatus 20, which is the slave unit. In the examples shown in FIGS. 6A and 6B, three types of A, B, and C are set as the identifier.

In the audio signal transmission system 1 according to the present embodiment, the identifier is matched between the master unit and the slave unit, as shown in FIG. 6A, (in the example of FIG. 6A, the identifier is set to A in the master unit and the slave unit) to enable bidirectional data communication between the master unit and the slave unit. If the same identifier is set, a plurality of audio signal receiving apparatuses 20 can be connected to one audio signal transmitting apparatus 10, as shown in FIG. 6A.

Furthermore, as shown in FIG. 6B, even if a plurality of audio signal transmitting apparatuses 10 and audio signal receiving apparatuses 20 exist in the same area, the respective master unit and the slave unit can coexist by differing the identifier selected by each master unit and the slave unit. In the example shown in FIG. 6B, only the audio signal receiving apparatuses 20 selecting the identifier A can be connected to the audio signal transmitting apparatus 10 selecting the identifier A; only the audio signal receiving apparatus 20 selecting the identifier B can be connected to the audio signal transmitting apparatus 10 selecting the identifier B; and only the audio signal receiving apparatus 20 selecting the identifier C can be connected to the audio signal transmitting apparatus 10 selecting the identifier C.

Figure 7:
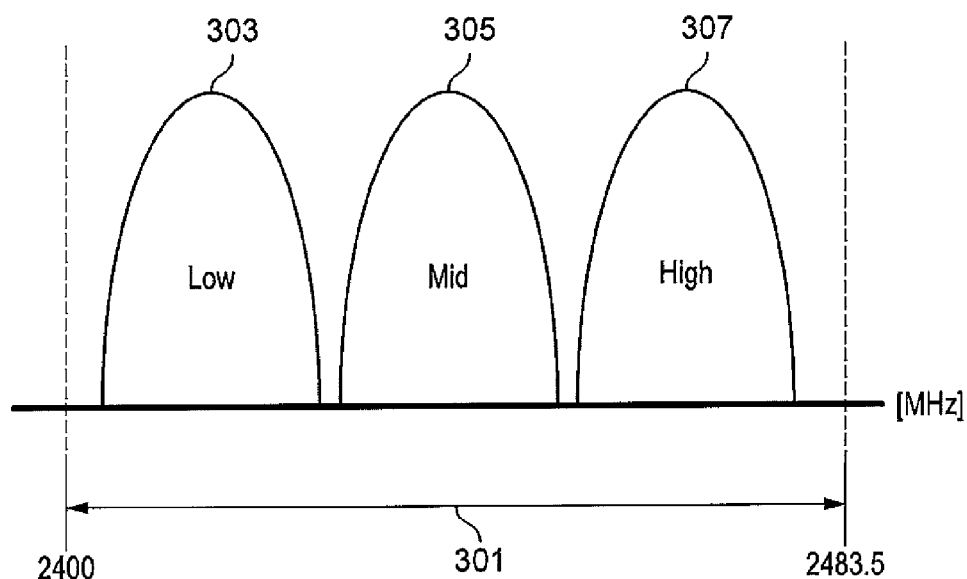
FIG. 7 is an explanatory view for describing a frequency allocation example in the audio signal transmission system according to the embodiment.
Figure 8:
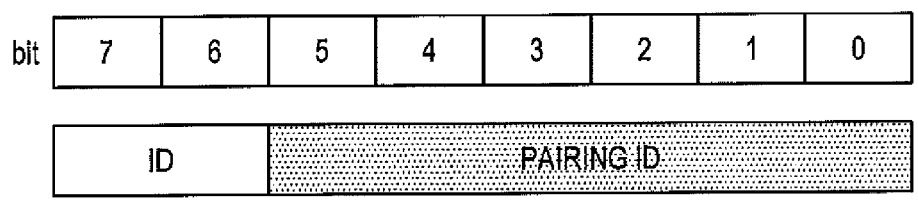
FIG. 8 is an explanatory view for describing a bit allocation example of an identifier in the audio signal transmission system according to the embodiment.

If the radio channel used in the bidirectional data communication is 2.4 GHz band 301 as shown in FIG. 7, three channels of channel Low 303, channel Mid 305, and channel High 307 are valid. In this case, in the selecting portion 153 of the audio signal transmitting apparatus 10, for example, the channel Low can be corresponded to the identifier A, the channel Mid can be corresponded to the identifier B, and the channel High can be corresponded to the identifier C. Here, if a bit allocation example of the identifier is one byte as shown in FIG. 8, the selecting portion 153 can set the identifier with two bits.

Two audio signal transmitting apparatuses 10 can select the same identifier, but to which audio signal transmitting apparatus 10 the audio signal receiving apparatus 20 is connected depends on the radio wave state of the audio signal transmitting apparatus 10 seen from the audio signal receiving apparatus 20. In other words, if the audio signal transmitting apparatus 10 selected with the same identifier exists in plurals, the audio signal receiving apparatus 20 is connected to the audio signal transmitting apparatus 10 of strong radio wave.

Figure 9:
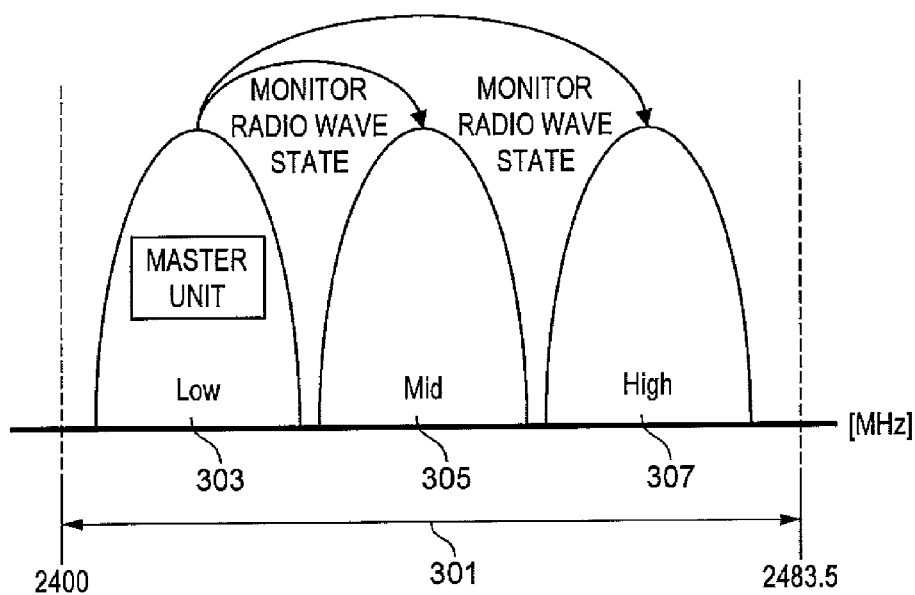
FIG. 9 is an explanatory view for describing a radio wave state monitoring function of the audio signal transmitting apparatus according to the embodiment.

The channel controlling portion 157 of the audio signal transmitting apparatus 10 according to the present embodiment sets the band pass of most satisfactory radio wave state of the radio channels CH Low, CH Mid, and CH High used in the bidirectional data communication as the communication radio channel. Thus, the radio wave state monitoring portion 155 constantly monitors the radio wave state of the radio channel. For instance, as shown in FIG. 9, if the audio signal transmitting apparatus 10, which is the master unit, is using the channel Low 303, the radio wave state monitoring portion 155 monitors the radio wave states of not only the channel Low 303, but also the channel Mid 305 and the channel High 307, and notifies the channel controlling portion 157 if the radio wave environment degrades due to another wireless system, electronic oven, and the like. The channel controlling portion 157 dynamically changes the radio channel to use based on the monitoring result transmitted from the radio wave state monitoring portion 155.

Figure 10:
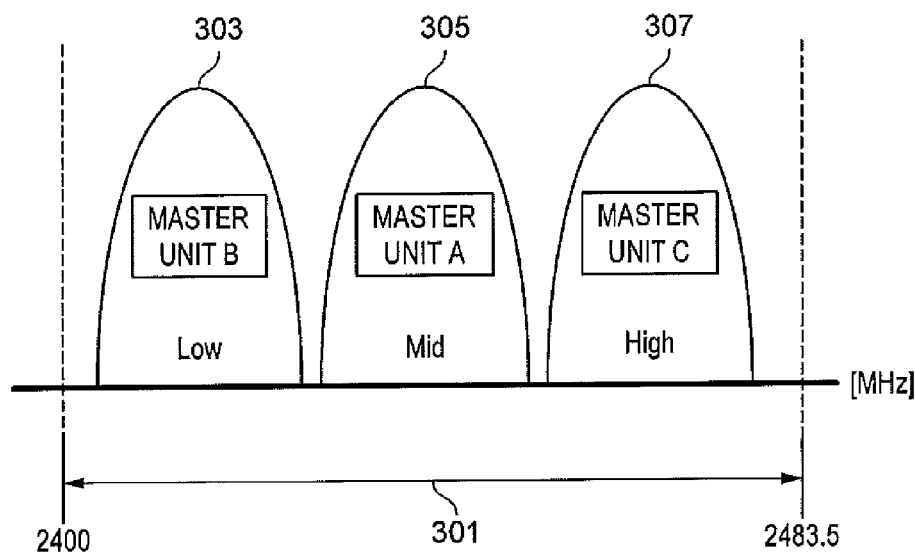
FIG. 10 is an explanatory view for describing a frequency allocation example of the audio signal transmitting apparatus according to the embodiment.

According to such function, if degradation of the radio wave state of the radio channel by disturbance is small or if only one audio signal transmitting apparatus 10 exists in the same area, satisfactory communication environment can be realized. Furthermore, if the audio signal transmitting apparatus 10 of less than or equal to the number of the identifier coexists, and degradation of the radio wave state of the radio channel by disturbance is not found, satisfactory communication environment can be expected to be realized by having each audio signal transmitting apparatus 10 select each radio channel, as shown in FIG. 10.

Figure 11:
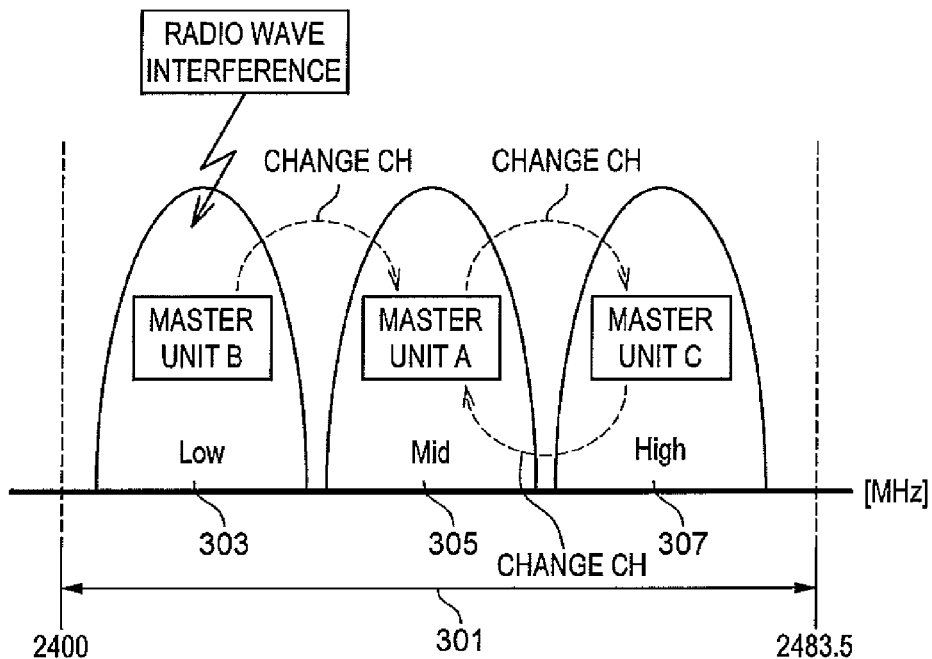
FIG. 11 is an explanatory view for describing a frequency allocation example of when the radio wave interference occurred in the audio signal transmission system according to the embodiment.
Figure 12:
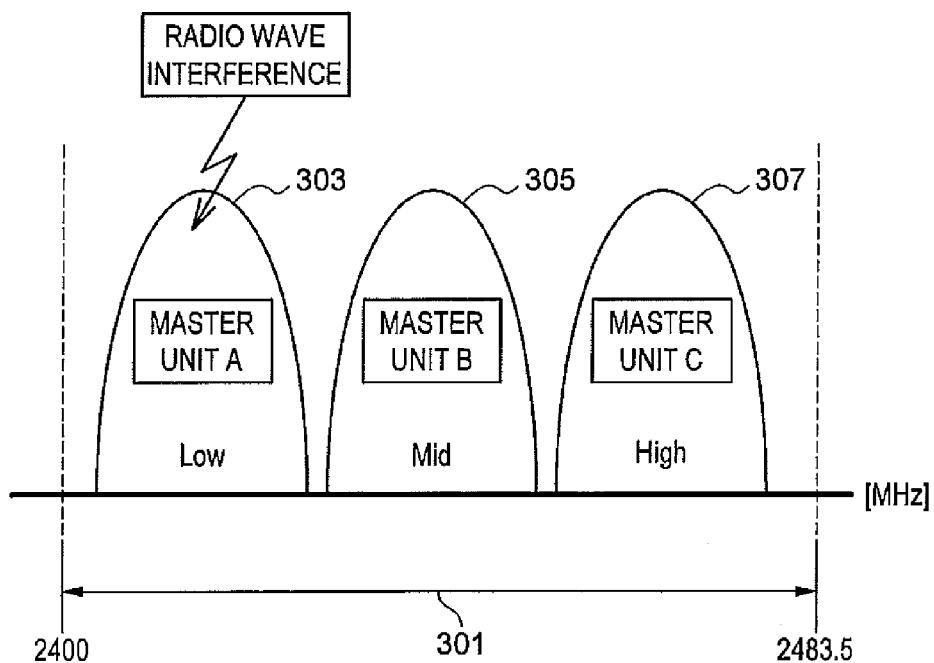
FIG. 12 is an explanatory view for describing a frequency allocation example of when the radio wave interference occurred in the audio signal transmission system according to the embodiment.

A case where radio wave interference occurred in a certain radio channel will be described with reference to FIGS. 11 and 12. FIGS. 11 and 12 are explanatory views for describing a frequency allocation example of when the radio wave interference occurred in the audio signal transmission system according to the present embodiment. In the following description, suppose a master unit (audio signal transmitting apparatus) A selects identifier A, a master unit B selects identifier B, and a master unit C selects identifier C.

As shown in FIG. 11, three audio signal transmitting apparatuses 10 of master unit A to master unit C exist in the same area, the master unit A uses channel Mid 305, the master unit B uses channel Low 303, and the master unit C uses channel High 307. In such state, consider a case where the electronic oven etc. is used in the same area, the radio wave interference occurred in channel Low 303, and the radio wave state of the channel Low 303 lowered.

In this case, the radio wave state monitoring portion 155 of the master unit B performing the communication with the channel Low 303 detects that the radio wave state (radio wave quality) lowered, and notifies the channel controlling portion 157 of the master unit B that the radio wave state of the channel Low 303 degraded and that the channel of most satisfactory radio wave state is the channel Mid 305. The channel controlling portion 157 of the master unit B then attempts to change the channel to use in the communication to the channel Mid 305.

The master unit A performing the communication in the channel Mid 305 attempts to change the channel to use in the communication to the channel High 307 of satisfactory radio wave state due to the lowering in the radio wave state occurred as a result of channel change to the channel Mid 305 of the master unit B.

Similarly, the master unit C performing the communication in the channel High 307 attempts to change the channel to use in the communication to the channel Mid 305 due to the lowering in the radio wave state occurred as a result of channel change to the channel High 307 of the master unit A.

Therefore, when the radio wave interference occurs in a certain radio channel, the above-described channel change is performed in chain reaction in each audio signal transmitting apparatus 10, and as a result, a so-called collision state in which none of the master unit is able to perform the communication arises.

In order to prevent the occurrence of such collision state, in the channel controlling portion 157 of the audio signal transmitting apparatus 10 according to the present embodiment, determination is made that the collision state occurred when the channel change of a predetermined number of times is already performed in a certain period (e.g., three channel changes are already performed in one second), and the collision state is avoided by performing a channel change to the radio channel corresponded in advance to the identifier selected by the selecting portion 153.

For instance, as shown in FIG. 12, when determined that the collision state is occurring, the channel controlling portion 157 of the master unit A performs channel change to the channel Low 303, the channel controlling portion 157 of the master unit B performs channel change to the channel Mid 305, and the channel controlling portion 157 of the master unit performs channel change to the channel High 307 regardless of the monitoring result transmitted from the radio wave state monitoring portion 155. In this case, the master unit A using the channel Low 303 has a possibility of causing sound discontinuity and the like due to the influence of disturbance by the electronic oven, but the master unit B using the channel Mid 305 and the master unit C using the channel High 307 are not subjected to the influence of disturbance, and a situation where none of the master unit can perform communication can be avoided.

Figure 13:
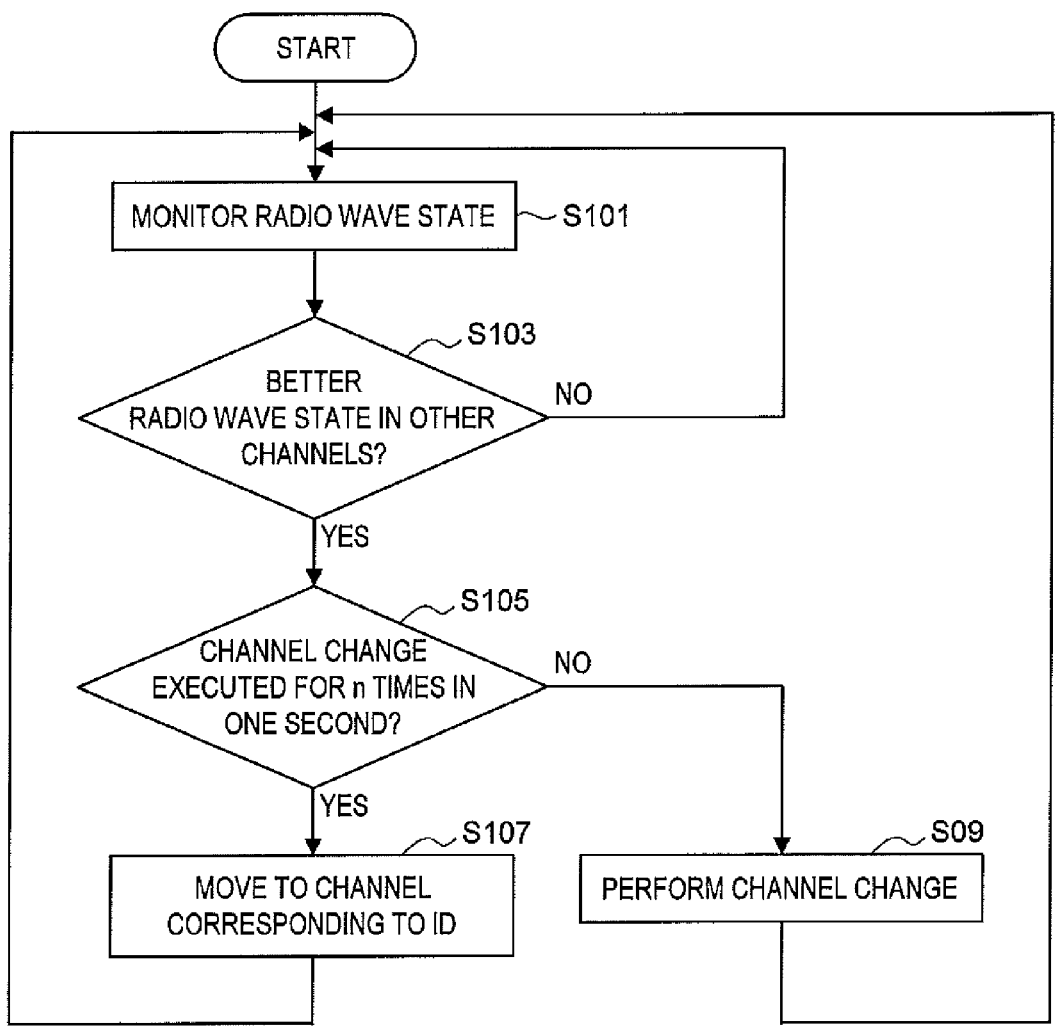
FIG. 13 is a flowchart for describing a channel change process according to the embodiment.

FIG. 13 is a flowchart for describing a channel change process in the audio signal transmitting apparatus 10 according to the present embodiment.

The radio wave state monitoring portion 155 of the audio signal transmitting apparatus 10 monitors the radio wave state of the radio channel used in communication, and notifies the monitoring result to the channel controlling portion 157 (step S101). The channel controlling portion 157 transmitted with the monitoring result makes a determination on the radio wave state of another channel not used in the communication based on the monitoring result, and determines the presence of a channel of more satisfactory radio wave state (step S103).

If another channel of more satisfactory radio wave state than the channel used in the communication does not exist, the channel controlling portion 157 does not perform channel change. If another channel of more satisfactory radio wave state than the channel used in the communication exists, the channel controlling portion 157 determines whether or not the channel change has already been performed for n times in one second based on the count result notified from the counter portion 157b (step S105).

If the count result is greater than or equal to n times, which is a threshold value, the channel controlling portion 157 determines that the collision state is occurring, and performs a channel change to the channel corresponded to the identifier irrespective of the monitoring result of the radio wave state (step S107). If the count result is smaller than n times, which is the threshold value, the channel controlling portion 157 changes the radio channel to use in the communication (step S109).

Therefore, in the audio signal transmission system according to the present embodiment, an optimum communication environment can be established without having the user being conscious of the radio channel to use. The connection of the transmitting apparatus and the receiving apparatus can be established even if a plurality of audio signal transmitting apparatuses 10 is simultaneously used through an operation of simply matching the identifiers of the audio signal transmitting apparatus 10 and the audio signal receiving apparatus 20.

When determined that the so-called collision state is occurring due to lowering in the radio wave state, the audio signal transmitting apparatus 10 according to the present embodiment automatically performs channel change of the radio channel used in the communication to the radio channel corresponded to the selected identifier, and thus the channel change is performed in chain reaction and a state in which the communication is unable to be performed can be avoided.

<Regarding Paring Process>

Figure 15:
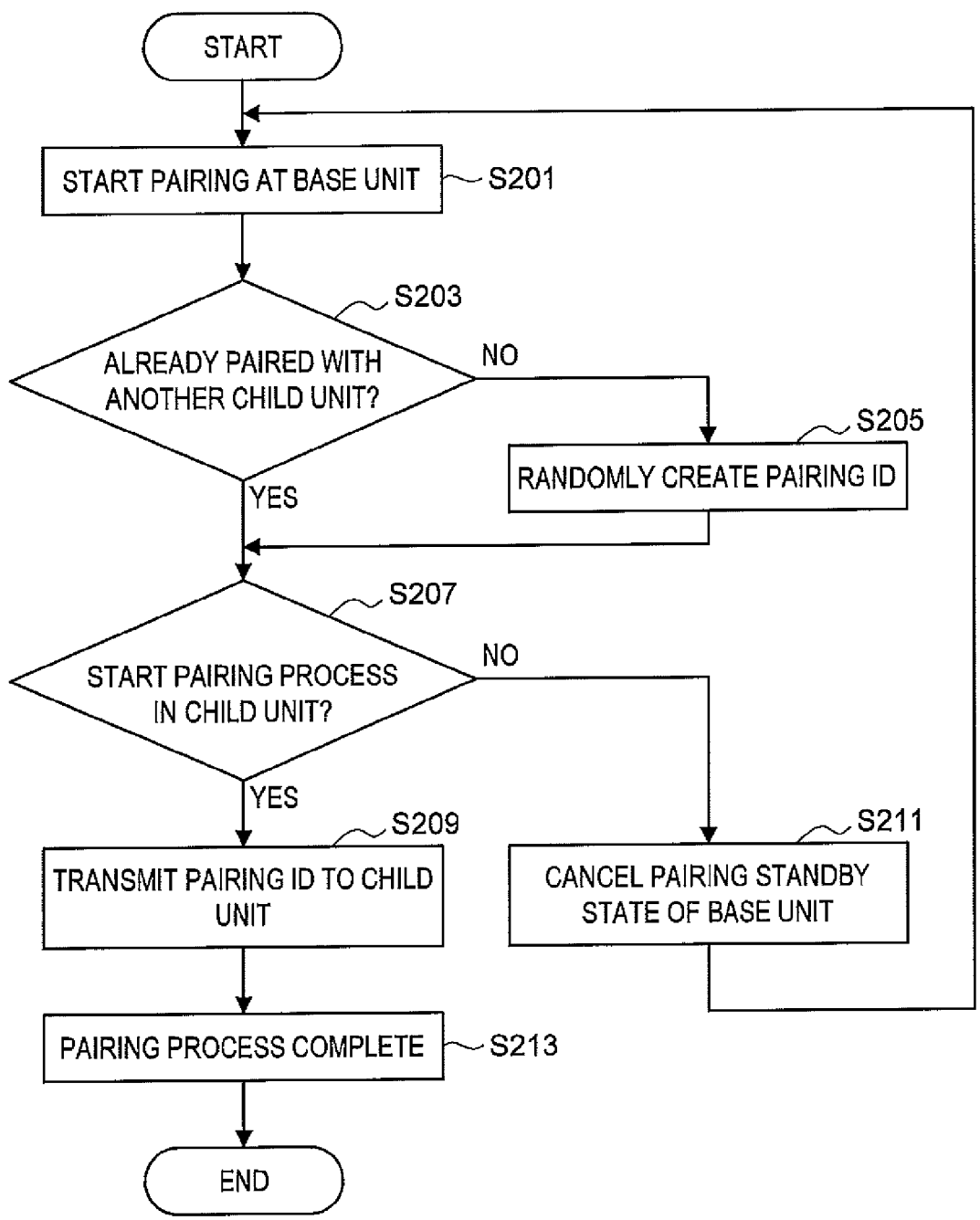
FIG. 15 is a flowchart for describing a pairing process according to the embodiment.

The pairing process performed in the audio signal transmitting apparatus 10 according to the present embodiment will now be described in detail with reference to FIGS. 14A to 15.

As shown in FIG. 14A, in the audio signal transmission system 1 according to the present embodiment, connection can be easily made by matching the identifiers between the audio signal transmitting apparatus 10 and the audio signal receiving apparatus 20A. However, if another audio signal receiving apparatus 20B with matching identifier exists in a communicable range of the audio signal transmitting apparatus 10, an unintended connection may be established between the audio signal transmitting apparatus 10 and the audio signal receiving apparatus 20B.

In the audio signal transmission system 1 according to the present embodiment, the arise of the above-described problem can be prevented by executing a pairing process of enabling only a specific audio signal receiving apparatus 20A to be connectable to the audio signal transmitting apparatus 10 to prevent connection (link) with an unintended audio signal receiving apparatus 20B.

In the pairing process, a specific pairing identifier (pairing ID) is shared between the audio signal transmitting apparatus 10 and the audio signal receiving apparatus 20. For instance, in the bit allocation example of the identifier shown in FIG. 8, the low order six bits are allocated to the pairing identifier, so that the pairing state can be easily established between the transmitting apparatus 10 and the receiving apparatus 20 set with the same identifier to prevent connection with an undesired device.

The pairing process is performed through at least three steps of: matching the identifier between the audio signal transmitting apparatus 10, which is the master unit, and the audio signal receiving apparatus 20, which is the slave unit; starting the pairing process in the master unit; and starting the pairing process in the slave unit.

The pairing state is released by changing the respective identifier of the master unit and the slave unit. When the identifier of the master unit is changed, the slave unit in pairing state with this master unit is collectively released with the pairing state. When the identifier of the slave unit is changed, the pairing state with the master unit of only the slave unit which identifier is changed is released. Thus, the pairing state can be released without going through complex procedures.

A flow of a pairing process in the audio signal transmission system according to the present embodiment will now be described with reference to FIG. 15.

First, the input portion such as pairing button mounted on the audio signal transmitting apparatus 10, which is the master unit, is operated by the user to start the pairing process (step S201), and the pairing controlling portion 159 of the master unit determines whether or not already paired with another slave unit (step S203). If not paired with another slave unit, the pairing controlling portion 159 of the master unit randomly creates a pairing identifier (pairing ID) (step S205), and records the created pairing identifier in the storage portion 165. If already paired with another slave unit, the pairing controlling portion 159 executes step S207 described hereinafter.

The pairing controlling portion 159 of the master unit determines whether or not a signal representing the start of the pairing process in the slave unit is received from the connection control portion 251 of the slave unit (step S207). If the signal indicating the start of the pairing processing in the slave unit is not received within a predetermined time, the pairing controlling portion 159 releases the pairing standby state of the master unit (step S211). If the signal indicating the start of the pairing process in the slave unit is received within a predetermined time, the pairing controlling portion 159 acquires the pairing identifier used in pairing with another slave unit from the storage portion 165, and transmits the acquired pairing identifier to the slave unit executing the pairing process (step S209). In the connection control portion 251 of the slave unit, the pairing with the master unit is established using the pairing identifier transmitted from the master unit, and the pairing process is completed (step S213).

Therefore, in the audio signal transmission system according to the present embodiment, the establishment and canceling of the connection between specific master unit and slave unit can carried out by simply operating the input portion such as button, and thus the pairing process between the master unit and the slave unit can be easily executed even in a system not mounted with GUI and keyboard.

It should be understood by those skilled in the art that various modifications, combinations, sub-combinations and alterations may occur depending on design requirements and other factors insofar as they are within the scope of the appended claims or the equivalents thereof.

For instance, in the above-described embodiment, the channel controlling portion 157 has been described as interiorly including the counter portion having a counter function. However, the counter portion may have a configuration independent from the channel controlling portion, and included in the audio information transmitting apparatus.

What is claimed is:

1. An information processing apparatus configured to communicate with at least another information processing apparatus using a first channel in a plurality of channels in a predetermined frequency band, the information processing apparatus comprising:
    a radio wave state monitoring portion for monitoring a radio wave state of at least a subset of the plurality of channels; and
    a channel controlling portion configured to set a second channel in the plurality of channels as a channel to use for communication with the other information processing apparatus if it is determined, based on monitoring results produced by the radio wave state monitoring portion, that the second channel has a more satisfactory radio wave state than the first channel and if it is determined that a number of times that a channel, used for communication with the other information processing apparatus, was changed, in a predetermined time period, is less than a threshold number of times.

2. The information processing apparatus according to claim 1, further comprising a selecting portion configured to select an identifier associated with a third channel in the plurality of channels,
    wherein the channel controlling portion is further configured to set the third channel as the channel to use for communication with the other information processing apparatus if it is determined that the number of times that a channel, used for communication with the other information processing apparatus, was changed in the predetermined time period is greater than or equal to the threshold number of times.

3. The information processing apparatus according to claim 2, wherein the channel controlling portion is configured to cancel communication with the other information processing apparatus using the third channel when a connection with the other information processing apparatus is canceled.

4. The information processing apparatus according to claim 2, wherein the channel controlling portion is configured to cancel communication with the other information processing apparatus using the third channel when the communication using the third channel is performed for a predetermined time period.

5. The information processing apparatus according to claim 1, wherein the radio wave state monitoring portion is configured to monitor the radio wave state of at least the subset of the plurality of channels based at least on a presence of interference of radio waves.

6. The information processing apparatus according to claim 5, wherein the radio wave state monitoring portion is configured to output the radio wave state of at least the subset of the plurality of channels to the channel controlling portion in real time.

7. The information processing apparatus according to claim 5, wherein the radio wave state monitoring portion is configured to output the radio wave state of at least the subset of the plurality of channels to the channel controlling portion at a predetermined time interval.

8. The information processing apparatus according to claim 1, wherein the radio wave state monitoring portion is configured to store a determination result of the radio wave state of at least the subset of the plurality of channels in a storage portion in association with information on a date or time when the determination result was obtained.

9. The information processing apparatus according to claim 1, further comprising a pairing controlling portion configured to perform a pairing process between the information processing apparatus and the other information processing apparatus, wherein the pairing process comprises:

initiating the pairing process at the information processing apparatus;

initiating the pairing process at the other information processing; and transmitting a random pairing identifier from the information processing apparatus to the other information processing apparatus.

10. The information processing apparatus of claim 1, wherein the information processing apparatus is configured to transmit an audio signal to the other information processing apparatus and the other information processing apparatus is an apparatus selected from the group consisting of one or more speakers, one or more headphones, and one or more earphones.

11. A method for communication of information with at least one information processing apparatus using a first channel in a plurality of channels in a predetermined frequency band, the method comprising:

monitoring a radio wave state of at least a subset of the plurality of channels; and setting a second channel in the plurality of channels as a channel to use for communication with the information processing apparatus if it is determined, based on a monitoring result of the radio wave state, that the second channel has a more satisfactory radio wave state than the first channel and if it is determined that a number of times that a channel, used for communication with the information processing apparatus, was changed, in a predetermined time period, is less than a threshold number of times.

12. The method of claim 11, further comprising:

selecting an identifier associated with a third channel in the plurality of channels, and setting the third channel as the channel to use for communication with the information processing apparatus if it is determined that the number of times that a channel, used for communication with the information processing apparatus, was changed in the predetermined time period is greater than or equal to the threshold number of times.

13. The method of claim 11, further comprising performing a pairing process between a device executing the method of claim 11 and the information processing apparatus, the pairing process comprising:

initiating the pairing process at the device;

initiating the pairing process at the information processing apparatus; and transmitting a random pairing identifier from the device to the information processing apparatus.

14. The method of claim 11, wherein the information processing apparatus is an apparatus selected from the group consisting of one or more speakers, one or more headphones, and one or more earphones.

15. A recording medium recorded with a program that when executed by an information processing apparatus configures the information processing apparatus to communicate with another information processing apparatus using a first channel in a plurality of channels in a predetermined frequency band by:

monitoring a radio wave state of at least a subset of the plurality of channels; and setting a second channel in the plurality of channels as a channel to use for communication with the other information processing apparatus if it is determined, based on a monitoring result of the radio wave state, that the second channel has a more satisfactory radio wave state than the first channel and if it is determined that a number of times that a channel, used for communication with the other information processing apparatus, was changed, in a predetermined time period, is less than a threshold number of times.

16. The recording medium of claim 15, wherein the program further configures the information processing apparatus to:

select an identifier associated with a third channel in the plurality of channels, and set the third channel as the channel to use for communication with the information processing apparatus if it is determined that the number of times that a channel, used for communication with the other information processing apparatus, was changed in the predetermined time period is greater than or equal to the threshold number of times.

17. The recording medium of claim 15, wherein the program further configures the information processing apparatus to perform a pairing process between the information processing apparatus and the other information processing apparatus, the pairing process comprising:

initiating the pairing process at the information processing apparatus;

initiating the pairing process at the other information processing apparatus; and transmitting a random pairing identifier from the information processing apparatus to the other information processing apparatus.

18. The recording medium of claim 15, wherein the information processing apparatus is configured to transmit an audio signal to the other information processing apparatus and the other information processing apparatus is an apparatus selected from the group consisting of one or more speakers, one or more headphones, and one or more earphones.

* * * * *